US009858288B2

(12) United States Patent
Wijayaratne et al.

(10) Patent No.: US 9,858,288 B2
(45) Date of Patent: *Jan. 2, 2018

(54) SYSTEM AND METHOD FOR EVENT-BASED SYNCHRONIZATION OF REMOTE AND LOCAL FILE SYSTEMS

(71) Applicant: Egnyte, Inc., Mountain View, CA (US)

(72) Inventors: Ravi Wijayaratne, San Jose, CA (US); Remus Koos, San Jose, CA (US); Ray White, San Jose, CA (US); Manish Marathe, San Jose, CA (US); Markku Mielityinen, Mountain View, CA (US); Amrit Jassal, Morgan Hill, CA (US); Rajesh Ram, Union City, CA (US); Sriram Gopalan, Santa Clara, CA (US); Aahz, San Carlos, CA (US); Heikki J. Toivonen, Santa Clara, CA (US)

(73) Assignee: EGNYTE, INC., Mountain View, CA (US)

(*) Notice: Subject to any disclaimer, the term of this patent is extended or adjusted under 35 U.S.C. 154(b) by 198 days.

This patent is subject to a terminal disclaimer.

(21) Appl. No.: 13/958,298

(22) Filed: Aug. 2, 2013

(65) Prior Publication Data

US 2014/0040196 A1 Feb. 6, 2014

Related U.S. Application Data

(60) Provisional application No. 61/679,339, filed on Aug. 3, 2012, provisional application No. 61/679,383, filed on Aug. 3, 2012.

(51) Int. Cl.
G06F 17/30 (2006.01)

(52) U.S. Cl.
CPC .... *G06F 17/30174* (2013.01); *G06F 17/3007* (2013.01)

(58) Field of Classification Search
CPC .................................................. G06F 17/3007
(Continued)

(56) References Cited

U.S. PATENT DOCUMENTS 5,600,834 A * 2/1997 Howard .............. G06F 11/1435
707/610
6,088,706 A * 7/2000 Hild ........................ H04L 29/06
(Continued)

OTHER PUBLICATIONS

*Keeping an Eye on Your NTFS Drives: The Windows 2000 Change Journal Explained;* MSDN; Jeffrey Cooperstein et al.; Microsoft Systems Journal, Sep. 1999; Web; May 1, 2015; https://www.microsoft.com/msj/0999/journal/journal.aspx.>.
(Continued)

*Primary Examiner* — Robert Beausoliel, Jr.
*Assistant Examiner* — Arthur Ganger
(74) *Attorney, Agent, or Firm* — Larry E. Henneman, Jr.; Gregory P. Gibson; Henneman & Associates, PLC

(57) ABSTRACT

A method for synchronizing a file system (FS) and a remote file system (RFS) includes monitoring the FS for FS events, generating FS event records, receiving RFS event records of RFS events, generating file system operations (FSOs) based on the FS and RFS event records, and communicating the FSOs to the FS and RFS to synchronize them. A method for generating the FSOs includes accessing a plurality of FS and/or RFS event records, processing the accessed records to generate processed event records, generating the FSOs based on the processed event records, and outputting the FSOs to cause synchronization of the FS and RFS. Systems are also described. The invention facilitates event-based, steady-state synchronization of local and remote file systems.

33 Claims, 18 Drawing Sheets

(58) Field of Classification Search
USPC .......................................................... 707/624
See application file for complete search history.

(56) References Cited

U.S. PATENT DOCUMENTS

| | | | |
|---|---|---|---|
| 6,560,615 | B1 | 5/2003 | Zayas et al. |
| 6,847,984 | B1* | 1/2005 | Midgley ............. G06F 11/1466 |
| 6,925,476 | B1* | 8/2005 | Multer .............. G06F 17/30144 |
| 7,085,779 | B2* | 8/2006 | Holtz ................ G06F 17/30067 |
| 7,636,743 | B2* | 12/2009 | Erofeev ............ G06F 17/30212 |
| 7,743,023 | B2* | 6/2010 | Teodosiu .......... G06F 17/30212 707/612 |
| 8,655,850 | B2 | 2/2014 | Ngo et al. |
| 2004/0068523 | A1 | 4/2004 | Keith, Jr. et al. |
| 2006/0004765 | A1 | 1/2006 | Anderson et al. |
| 2006/0129627 | A1 | 6/2006 | Phillips et al. |
| 2010/0265823 | A1 | 10/2010 | Zhao et al. |
| 2011/0218964 | A1 | 9/2011 | Hagan et al. |
| 2011/0276573 | A1* | 11/2011 | Wang ................ G06F 11/1453 707/740 |
| 2013/0060842 | A1 | 3/2013 | Grossman |
| 2014/0379647 | A1 | 12/2014 | Smith et al. |
| 2015/0058503 | A1 | 2/2015 | Deguchi |

OTHER PUBLICATIONS

U.S. Appl. No. 13/958,435, Office Action dated May 8, 2015.
U.S. Appl. No. 13/958,435, Office Action dated Nov. 17, 2015.
U.S. Appl. No. 13/958,435, Office Action dated May 5, 2016.
U.S. Appl. No. 13/958,435, Office Action dated Nov. 22, 2016.
U.S. Appl. No. 14/805,226, Office Action dated Aug. 29, 2017.

* cited by examiner

File/File Event Reduction Table ← 1002

| T \ T+1 | Create 1004 | Update 1006 | Unlink 1008 | RSF 1010 | RDF From SRC2 1012 |
|---|---|---|---|---|---|
| Create (C) 1014 | DES | DES | Update | NR | DES |
| Update (U) 1016 | C w/ U timestamp | U (2nd) | DES | DES | NR |
| Unlink 1018 | RE | Unlink | DES | DES | Unlink SRC2 |
| RSF to DST2 1020 | C DST2 | NR | DES | DES | RSF to DST2 |
| RDF 1022 | NR | NR | NR | NR | Unlink SRC2; RDF |

DES: Dirty Event State. This succession of two events should not happen. Log DES.
NR: No Reduction Possible
RE: Reduce Events

FIG. 10A

File/Directory Event Reduction Table — 1024

| T \ T+1 | Create 1026 | Update 1028 | Unlink 1030 | RSF 1032 | RDF From SRC2 1034 |
|---|---|---|---|---|---|
| MKDIR 1036 | DES | DES | NR | NR | DES |
| RMDIR 1038 | DES | DES | DES | DES | DES |
| RSD 1040 | DES | DES | DES | DES | DES |
| RDD 1042 | DES | DES | NR | NR | DES |

FIG. 10B

Directory/File Event Reduction Table — 1044

| T \ T+1 | MKDIR 1046 | RMDIR 1048 | RSD 1050 | RDD 1052 |
|---|---|---|---|---|
| CREATE 1054 | DES | NR | NR | DES |
| UPDATE 1056 | DES | DES | DES | DES |
| UNLINK 1058 | DES | DES | DES | DES |
| RSF to DST2 1060 | DES | DES | DES | DES |
| RDF 1062 | DES | NR | NR | DES |

FIG. 10C

Directory/Directory Event Reduction Table ← 1064

| T＼T+1 | MKDIR 1066 | RMDIR 1068 | RSD 1070 | RDD 1072 |
|---|---|---|---|---|
| MKDIR 1074 | DES | NR | NR | DES |
| RMDIR 1076 | RE | DES | DES | RMDIR SRC |
| RSD 1078 | NR | DES | DES | RSD SRC1 to DST2 |
| RDD 1080 | DES | NR | NR | DES |

FIG. 10D

RFS File/LFS File Conflict Actions   ← 1102

| RFS \ LFS | Create A 1104 | Update A 1106 | Unlink A 1108 | RSF A to C 1110 | RDF C to A 1112 |
|---|---|---|---|---|---|
| Create A 1114 | Pull A | * | * | * | Push A, Move C to A |
| Update A 1116 | * | Pull A | Push A | Move A to C, Push C | Push A, Move C to A |
| Unlink A 1118 | * | Pull A | NA, Remove path from Sync table | Pull C | Move C to A |
| RSF A to B 1120 | * | LMove A to B, Pull B | Push B | Pull C, Push B | LMove A to B, Move C to A |
| RDF B to A 1122 | LMove B to A | LMove B to A | LMove B to A | LMove B to A, Pull C | FRS |

NA: No Action
FRS: Full Rescan Sync
(*): This combination of events should not happen. Log error and trigger FRS.
Pull: Pull file from remote cloud and push local file to remote cloud.
Push: Push local file to remote cloud.
Move: Move file in LFS (This is a RFS rename that translates into an LFS rename.)
LMove: Move file in RFS (This is an LFS rename that translates into a CFS rename.)

FIG. 11A

LFS File/RFS Directory Conflict Actions ⟵ 1124

| RFS \ LFS | MKDIR A 1126 | RMDIR A 1128 | RSD A to C 1130 | RDD C to A 1132 |
|---|---|---|---|---|
| Create A 1134 | Skip | * | * | Skip |
| Update A 1136 | Skip | * | * | Skip |
| Unlink A 1138 | * | * | * | * |
| RSF A to B 1140 | * | * | * | * |
| RDF B to A 1142 | Skip | * | * | Skip |

(*): This combination of events should not happen. Log error and trigger FRS.
Skip: Incompatible events. Log Warning and skip. Do not trigger FRS.

FIG. 11B

LFS Directory/RFS File Event Actions ⟵ 1144

| RFS \ LFS | Create A 1146 | Update A 1148 | Unlink A 1150 | RSF A to C 1152 | RDF C to A 1154 |
|---|---|---|---|---|---|
| MKDIR A 1156 | Skip | Skip | * | * | Skip |
| RMDIR A 1158 | * | * | * | * | * |
| RSD A to B 1160 | * | * | * | * | * |
| RDD B to A 1162 | Skip | Skip | * | * | Skip |

FIG. 11C

RFS Directory/LFS Directory Conflict Actions ← 1164

| RFS / LFS | MKDIR A 1166 | RMDIR A 1168 | RSD A to C 1170 | RDD C to A 1172 |
|---|---|---|---|---|
| MKDIR A 1174 | NA, add path to Sync table | * | * | LRS A |
| RMDIR A 1176 | * | NA, recursively remove from Sync table | LRS C | Move C to A |
| RSD A to B 1178 | * | LRS B | LRS C, LRS B | LMove A to B, Move C to A |
| RDD B to A 1180 | LMove B to A | LMove B to A | LMove B to A, LRS C | FRS |

FRS: Full Rescan Sync
LRS: Limited Rescan Sync
NA: No Action
(*): This combination of events should not happen. Log error and trigger FRS.
Move: Move folder in LFS (This is a RFS rename that translates into an LFS rename.)
LMove: Move folder in RFS (This is an LFS rename that translates into a CFS rename.)

FIG. 11D

SYSTEM AND METHOD FOR EVENT-BASED SYNCHRONIZATION OF REMOTE AND LOCAL FILE SYSTEMS

CROSS-REFERENCE TO RELATED APPLICATIONS

This application claims the benefit of U.S. Provisional Patent Application Ser. No. 61/679,339, filed Aug. 3, 2012 and having at least one common inventor, which is incorporated by reference herein in its entirety. This application also claims the benefit of U.S. Provisional Patent Application Ser. No. 61/679,383, filed Aug. 3, 2012 and having at least one common inventor, which is also incorporated by reference herein in its entirety.

BACKGROUND OF THE INVENTION

Field of the Invention

This invention relates generally to computer systems, and more particularly to cloud file storage systems. Even more particularly, this invention relates to synchronizing a local file system and a remote cloud file system stored remotely.

Description of the Background Art

Cloud computing systems are known. In cloud computing systems, computing and storage services are provided to remote clients over a wide area network such as the Internet. In the case of storage, a client's local files can be stored on the cloud and accessed by the client remotely.

Often a client's file system will exist both in the client's local storage device (e.g., a hard drive, network attached storage (NAS) device, etc.) and in the cloud. For example, a client might store a backup copy of its local file system in the cloud. Doing so is beneficial from the standpoint that the client has a backup copy of its file system. However, any benefit of the backup is negated as more and more changes are made to the local file system. Thus, it becomes a burden on the client to make sure the file system stored on the cloud is up to date. It is common for the file system on the cloud to be significantly older than the local file system, putting the local file system at risk if it is damaged.

In some cases, the client might also want to access its file system on the cloud. If changes to the cloud file system are made, then the cloud file system will become different from the local file system. As indicated above, problems arise when the local and cloud file systems become different.

What is needed, therefore, is a system and method that facilitates synchronizing a client's local file system with its file system on the cloud. What is also needed is a system and method that facilitates such synchronization in near real time. What is also needed is a system and method that facilitates such synchronization regardless of whether changes are made to the client's local file system or the associated cloud file system.

SUMMARY

The present invention overcomes the problems associated with the prior art by providing a system and method for event-based, steady-state synchronization of local and remote (cloud) file systems. The invention facilitates near-real-time synchronization and conflict resolution of remote and local file systems so that each of the remote and local file system are up-to-date. The synchronization is bidirectional and is carried out whether changes are made to the remote file system or to the local file system. Thus, clients can maintain local and remote access to up-to-date data.

A method for synchronizing a file system (FS) and a remote file system (RFS) that is located remotely from the FS is disclosed. The method includes monitoring the FS for FS events, where each of the FS events is indicative of a change made to the FS, and generating a plurality of event records based on the FS events. The method further includes receiving a plurality of RFS event records indicative of remote events that changed the RFS, generating file system operations (FSOs) based in part on the event records and RFS event records, and then communicating the file system operations to the FS and RFS to synchronize the FS and RFS. The RFS event records can be received, and the file system operations can be provided to the RFS, via a connection established with a remote file storage system having access to the RFS. Additionally, the generating step can optionally be initiated after each event record is generated or according to an (optionally adjustable) event synchronization time period. Event records and RFS event records associated with events occurring during the event synchronization period will be used to generate file system operations. Methods also include initially synchronizing the FS and RFS prior to the step of monitoring for events. Monitoring the FS for changes can include monitoring calls to the FS from the client, and executing a trap that causes an event record to be generated each time a call change the FS.

A particular method also includes processing the event records and RFS event records to generate a set of processed event records such that the step of generating FSO's is based at least in part on the set of processed event records. Processing events can include identifying by type and modifying at least some of the event records of that type. Processing events can also include deleting some of the event records (or RFS event records). Sometimes the step of processing events also includes accessing an FS event record and an RFS event record related to a file system object common to both the FS and RFS, and resolving an event conflict between the first event record and the second RFS event record.

The methods can also include storing (e.g., chronologically) the event records in a first events database and storing (e.g., chronologically) the RFS event records in a second events database. The event records and RFS event records can also be retrieved from their respective databases chronologically and/or according to the hierarchies of the FS and RFS, respectively. Prior to the step of generating file system operations, some of the event records and some of the RFS event records can be copied to third and fourth (view) databases, respectively.

Another method for synchronizing an FS and an RFS includes the steps of monitoring the FS for events, generating an event record in response to the occurrence of each event, optionally receiving a request for event records, and transmitting the event records to a remote file storage system having access to the RFS.

A file storage system for use with a remote file storage system is also disclosed. The file storage system includes memory storing a file system (FS) with FS objects, a client interface for providing client access, a file system module that monitors for changes being made to the FS by the client and outputs event information about the changes, and a data monitor that generates event records based on the event information from the file system module. The server also includes a remote file server interface for communicating with the remote system, a synchronizer that receives RFS event records from the remote system, an event processor that generates FSOs based on the event records and RFS event records, and an output that can communicate the FSOs to the FS and RFS to synchronize the FS and RFS. Optionally, the FS and RFS can be initially synchronized. The file system module can monitor I/O calls going to the FS and execute a trap for each of the I/O calls, which results in an event record being generated. The event processor can generate FSOs responsive to each event record being generated or according to an event synchronization time period described above. The synchronizer can be further operative to request RFS event records from the remote server via the remote file server interface. The system can also include a sync action handler operative to cause (e.g., via APIs) some of the FSOs to be applied to the FS and others of the FSOs to be transmitted to the RFS for application.

The system can also include a first and second events database that store (e.g., chronologically) FS and RFS event records, respectively. Additionally, the first and second event databases are operative to return FS event records and RFS event records chronologically and/or according to the hierarchies of the FS and RFS, respectively. The system can also include third and fourth (view) databases. The data monitor can copy some of the event records from the first database to the third database, and the synchronizer can copy some of the RFS event records from the second database to the fourth database. The event processor is then operative to generate the FSOs using only the FS and RFS event records stored in the third and fourth databases.

The event processor can also process the event records and RFS event records to generate a set of processed event records, e.g., before or as part of the FSO generation process. For example, the event processor can identify event records (and RFS event records) associated with particular types of events and modify some of the event records having that particular type. The event processor can also delete some of the event records. Furthermore, the event processor can identify conflicts between FS and RFS event records associated with a common file system object, and cause FSOs to be generated that resolve that conflict.

Another file storage system for use with a remote file storage system having access to an RFS is also disclosed. The file storage system includes memory storing a file system (FS) with FS objects, a client interface for providing client access to the FS, a file system module that monitors for changes being made to the FS by the client, and a data monitor that generates an event record responsive to a change being made to the FS. The system also includes a remote file server interface for establishing a connection with the remote file storage system and a synchronizer operative to transmit the event record to the remote file storage system via the remote file server interface.

Yet another file storage system according to the invention includes a local file storage system storing a local file system (LFS) and a remote file storage system storing an RFS. The system also includes a local event monitor on the local system that generates local event records indicative of changes made to the LFS and a remote event monitor on the remote system that generates remote event records indicative of changes made to the RFS. The system further includes an event processor on at least one of the local file storage system and the remote file storage system that is operative to use local and remote event records to synchronize the LFS and the RFS.

A method for generating file system operations for synchronizing the FS and RFS is also described herein. That method includes the steps of accessing a plurality of event records associated with changes previously made to the FS and the RFS, processing the event records to generate a set of processed event records, generating FSOs based at least in part on the set of processed event records, and outputting the FSOs to cause synchronization of the FS and the RFS. The step of processing the event records can include first, processing ones of the event records that are associated with the FS independently from ones of the event records that are associated with the RFS, and second, jointly processing the event records associated with the FS and the RFS.

In a particular method, the step of processing event records includes identifying ones of the event records according to a type of event and modifying at least some of the identified event records having that type. For example, for a rename event indicative of a path modification to a file system object (e.g., an object rename or move), the method includes accessing a first event record indicative of a first rename event and modifying a path associated with a second event record based on the first rename event. A timestamp of the second event record can also be modified. Another example includes identifying event records associated with folder deletions, accessing an event record indicative of a first folder being deleted, and deleting a second event record associated with the first folder.

As indicated above, the step of processing the event records can include deleting some of the event records. For example, the method can include the steps of identifying redundant event records associated with a file system object (e.g., a file or folder) and deleting the redundant event records. Identifying redundant events can include a step of comparing a later-occurring event record associated with the file system object with an earlier-occurring event record associated with the file system object. As another example, a particular FS event record and a particular RFS event records can be deleted if they both perform the same action (e.g., delete a file system object, create of a folder, etc.) in the FS and RFS.

Another particular method of processing the event records includes accessing a first event record associated with a first event occurring to a common file system object in the FS, accessing a second event record associated with a second event occurring to the common file system object in the RFS, and resolving a conflict between the first event and the second event (e.g., by generating FSOs using a lookup table, executing a different synchronization process, etc.). Still another particular method of processing the event records includes identifying ones of the event records that are associated with a particular file system object and using a look-up table to determine if at least one of the identified event records should be modified.

A server for generating file system operations for synchronizing an FS and an RFS is also disclosed. The server includes memory storing a plurality of event records associated with changes previously made to one of the FS and the RFS, an event processor operative to process the event records to generate a set of processed event records, an operations generator operative to generate FSOs based at least in part on the set of processed event records, and an output port operative to output the FSOs to cause synchronization of the FS and the RFS. In a particular embodiment, the event processor is operative to, first, process ones of the event records that are associated with the FS independently from ones of the event records that are associated with the RFS, and second, jointly process the event records associated with the FS and the RFS.

The event processor can process event records in various ways. For example, the event processor can identify ones of the event records based on the type of event and modify at least some of the identified event records having that type. One type is a rename event and the event processor can access a first event record indicative of a first rename event (an object rename or move) and modify a path (and optionally timestamp) associated with a second event record based on the first rename event. Another type is folder deletions. In such a case, the event processor can access a first event record indicative of a first folder being deleted and delete a second event record associated with the first folder.

The event processor can also delete some event records in other ways to generate the set of processed event records. For example, the event processor can identify and delete redundant event records occurring on a file system object (e.g., a file or folder). Redundant events can be identified by comparing chronological events occurring on the same file system path. The event processor can also delete an FS event record and an RFS event record that both indicate the same event (e.g., deleting the same object or creating the same folder) on both the FS and RFS.

The event processor also processes events by generating FSOs that resolve a conflict between an FS event and an RFS event occurring on a file system object common to both the FS and RFS. Lookup tables can be employed to determine the FSO(s) to resolve a conflict. In response to some event conflicts/errors, the event processor is operative to generate instructions to initiate a re-synchronization process of the FS and RFS. The event processor can also use the look up tables to determine which event records, each of which being associated with the same file system object, should be modified during event processing.

BRIEF DESCRIPTION OF THE DRAWINGS

The present invention is described with reference to the following drawings, wherein like reference numbers denote substantially similar elements:

FIGS. 10A-10D are event reduction tables used by the phase 1 module of FIG. 9;

FIGS. 11A-11D are conflict resolution tables used by the phase 2 module of FIG. 9;

DETAILED DESCRIPTION

The present invention overcomes the problems associated with the prior art by providing a system and method for event-based, steady-state synchronization of local and remote (cloud) file systems. In the following description, numerous specific details are set forth (e.g., pseudo-code for functional modules, etc.) in order to provide a thorough understanding of the invention. Those skilled in the art will recognize, however, that the invention may be practiced apart from these specific details. In other instances, details of well-known computing practices and components and components have been omitted, so as not to unnecessarily obscure the present invention.

Figure 1:
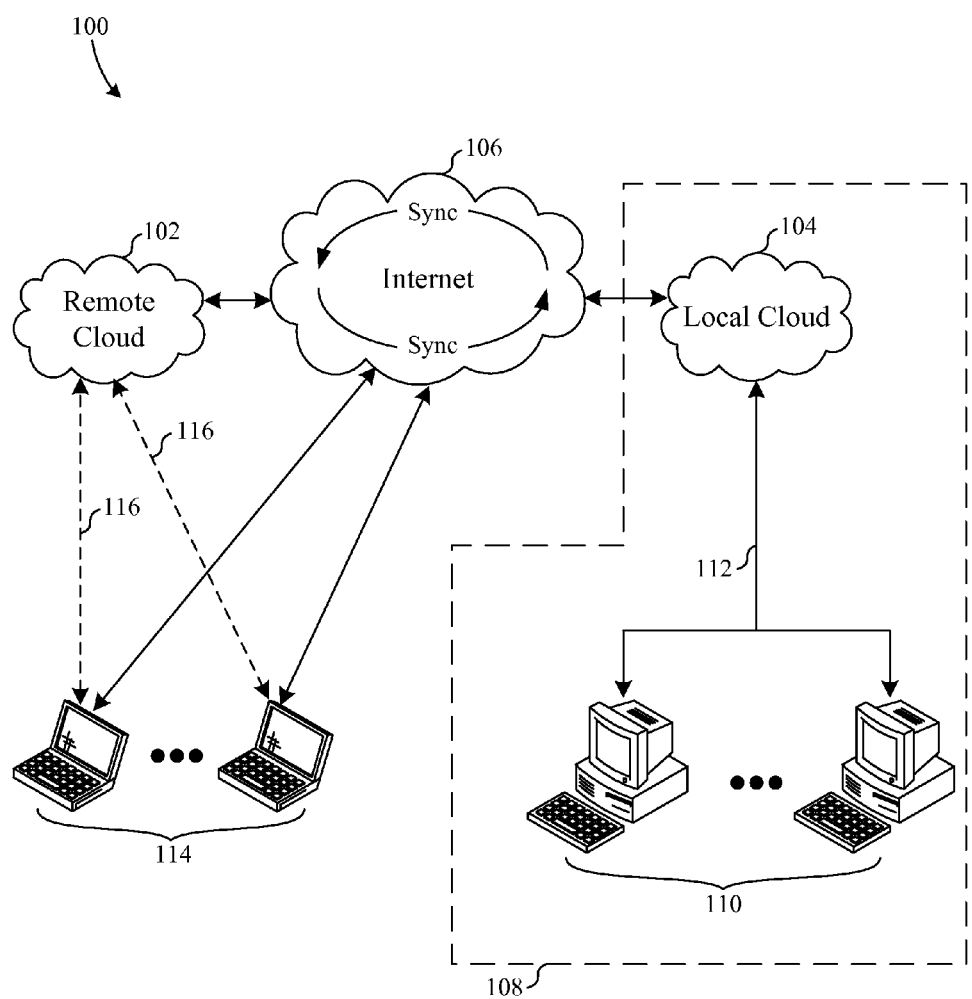
FIG. 1 is a diagram of a cloud computing system.

FIG. 1 shows a cloud computing system 100 to include a remote cloud server 102 and a local cloud server 104, which communicate and are synchronized via the Internet 106. Local cloud 104 can be hosted, for example, by a file server in an office 108 and is, therefore, sometimes referred to as an office local cloud (OLC). Local clients 110 can access cloud files by directly accessing files/objects stored on local cloud 104, via a local network 112. Remote clients 114 can access cloud files by accessing files/objects stored on remote cloud 102, via Internet 106, or via some other connection 116 with cloud server 102. The local cloud server 104 is bi-directionally synchronized with the remote cloud server 102 to provide local and remote data access and remote data security.

Figure 2A:
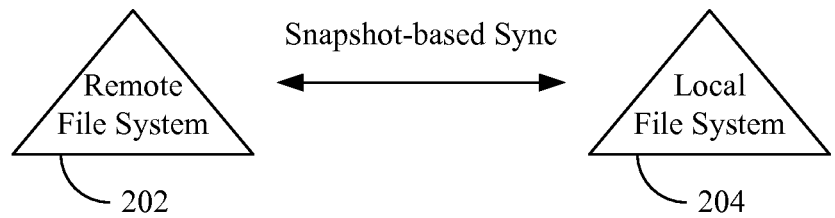
FIG. 2A illustrates one method of synchronizing a remote file system and a local file system.

FIG. 2A illustrates a snapshot-based method of synchronizing a remote file system (RFS) 202 stored on remote cloud 102 and a local file system (LFS) 204 stored on local cloud 104. Synchronization is the process by which RFS 202 and LFS 204 can be made identical at a particular time, $T_S$. In other words, RFS 202 and LFS 204 are considered synchronized when, as of a time $T_S$, the same file system objects stored on LFS 204 are also stored on the RFS 202.

The RFS 202 can be initially created and synchronized with the LFS 204 using a full file system scan (FFS) wherein the LFS 204 is initially copied to remote cloud 102 and stored as RFS 202, for example, when an account is opened with a remote cloud service provider. Subsequently, the LFS 204 and the CFS 202 can be periodically synchronized using bi-directional snapshot-based synchronizations. For example, a full rescan sync (FRS) process can be used to "walk" the LFS 204 and the RFS 202 and create metadata snapshots of these file systems at a time $T_S$. These snapshots can then be compared and the differences used to bi-directionally synchronize the two file systems. A limited rescan sync (LRS) is similar to the FRS, but is only based on partial metadata snapshots (e.g., snapshots for particular folders, etc.) of the two file systems. The snapshot-based synchronization method is more CPU and memory intensive and does not scale well for file systems with large namespaces.

Figure 2B:
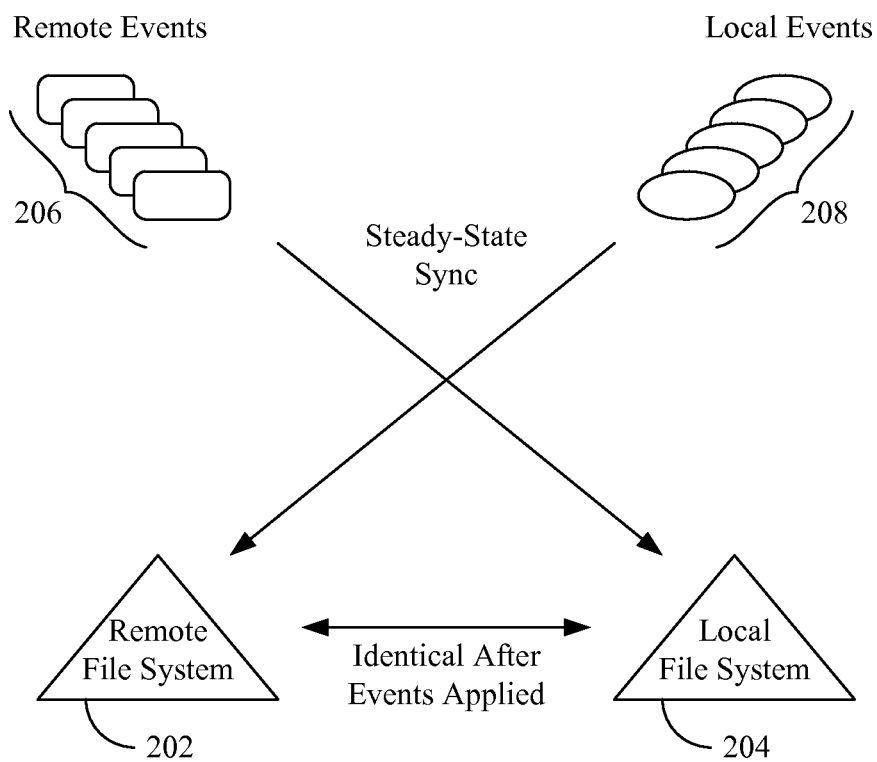
FIG. 2B illustrates another method of synchronizing a remote file system and a local file system.

FIG. 2B illustrates a steady-state, event-based synchronization method according the present invention. This method is based on monitoring and collecting all of the changes made to the LFS 204 by local clients 110 and to the RFS 202 by remote clients 114 from some point in time, $T_1$. Changes made to the RFS 202 and to the LFS 204 are called remote events 206 and local events 208, respectively. Then, at a later time $T_2$, the remote events 206 and local events 208 are processed and appropriate file system operations are generated and applied to RFS 202 and LFS 204 to synchronize RFS 202 and LFS 204 as of time $T_2$. The time period between $T_1$ and $T_2$ is called the event synchronization period.

The steady-state synchronization process of FIG. 2B enables the RFS 202 and LFS 204 to remain synchronized in near real-time as the RFS 202 and LFS 204 are synchronized for consecutive event synchronization periods. The steady-state synchronization process is also easily scalable and uses resources more efficiently than relying solely on the snapshot-based methods of FIG. 2A.

Figure 3:
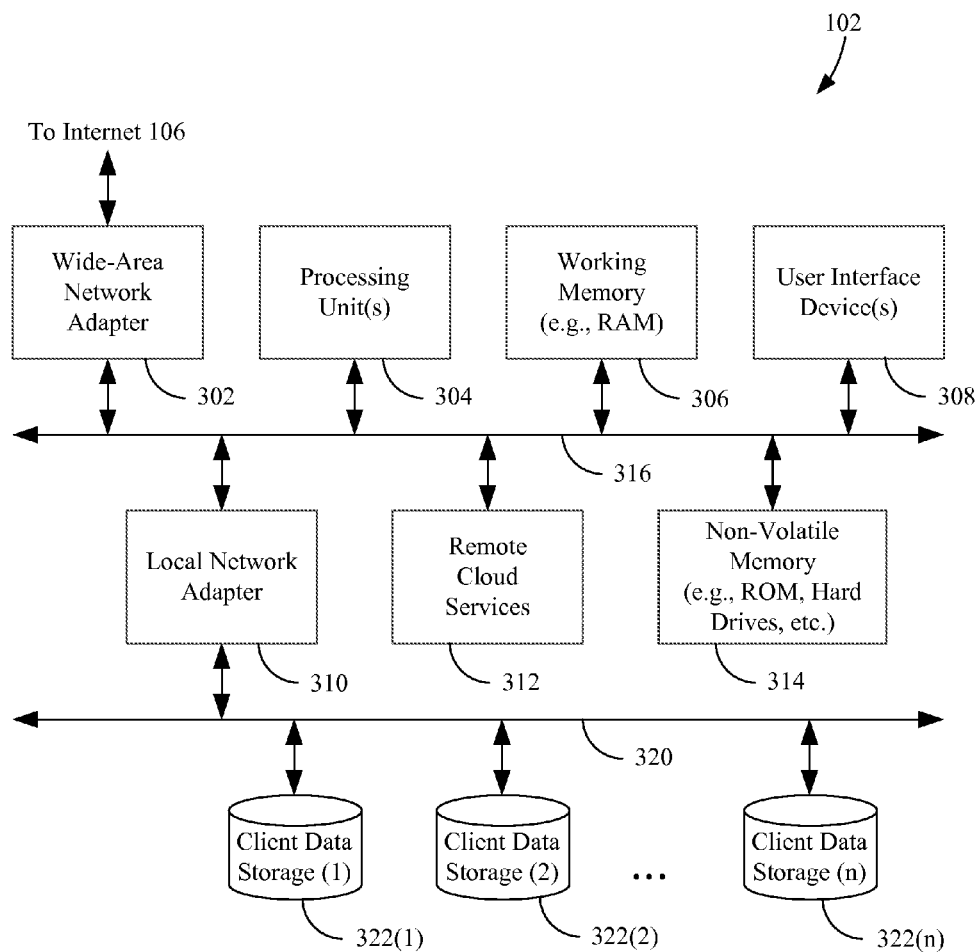
FIG. 3 is a block diagram of a remote file storage server.

FIG. 3 is a block diagram of remote cloud server 102. Remote cloud server 102 includes a wide-area network adapter 302, one or more processing units 304, working memory 306, one or more user interface devices 308, a local network adapter 310, a remote cloud services component 312, and non-volatile memory 314, all intercommunicating via an internal bus 316. Processing units(s) 304 impart functionality to remote cloud server 102 by executing code stored in any or all of non-volatile memory 314, working memory 306, and remote cloud services 312. Remote cloud services 312 represents hardware, software, firmware, or some combination thereof, that provides the synchronization functionality described herein.

Wide area network adapter 302 provides a means for remote cloud server 102 to communicate with remote clients 114 and local cloud 104 via Internet 106. Local network adapter 310 provides a means for accessing a plurality of data storage devices 322(1-n), via a private network 320. Clients' files are stored in and retrieved from data storage devices 322(1-n) as needed. Additional data storage devices 322(n+) can be added as needed to provide additional storage capacity. In this example embodiment, data storage devices 322(1-n) are network attached storage (NAS) devices, but any suitable type of storage device can be used.

Cloud-based object-storage infrastructures are further described in U.S. patent application Ser. No. 13/708,040, filed on Dec. 7, 2012 by Shetty et al. and entitled "System And Method Of Implementing An Object Storage Infrastructure For Cloud-Based Services", which is incorporated herein by reference in its entirety. Furthermore, permission management frameworks for cloud servers is described in U.S. patent application Ser. No. 13/689,648, filed on Nov. 29, 2012 by Wijayaratne et al. and entitled "Flexible Permission Management Framework For Cloud Attached File Systems", which is also incorporated herein by reference in its entirety.

Figure 4:
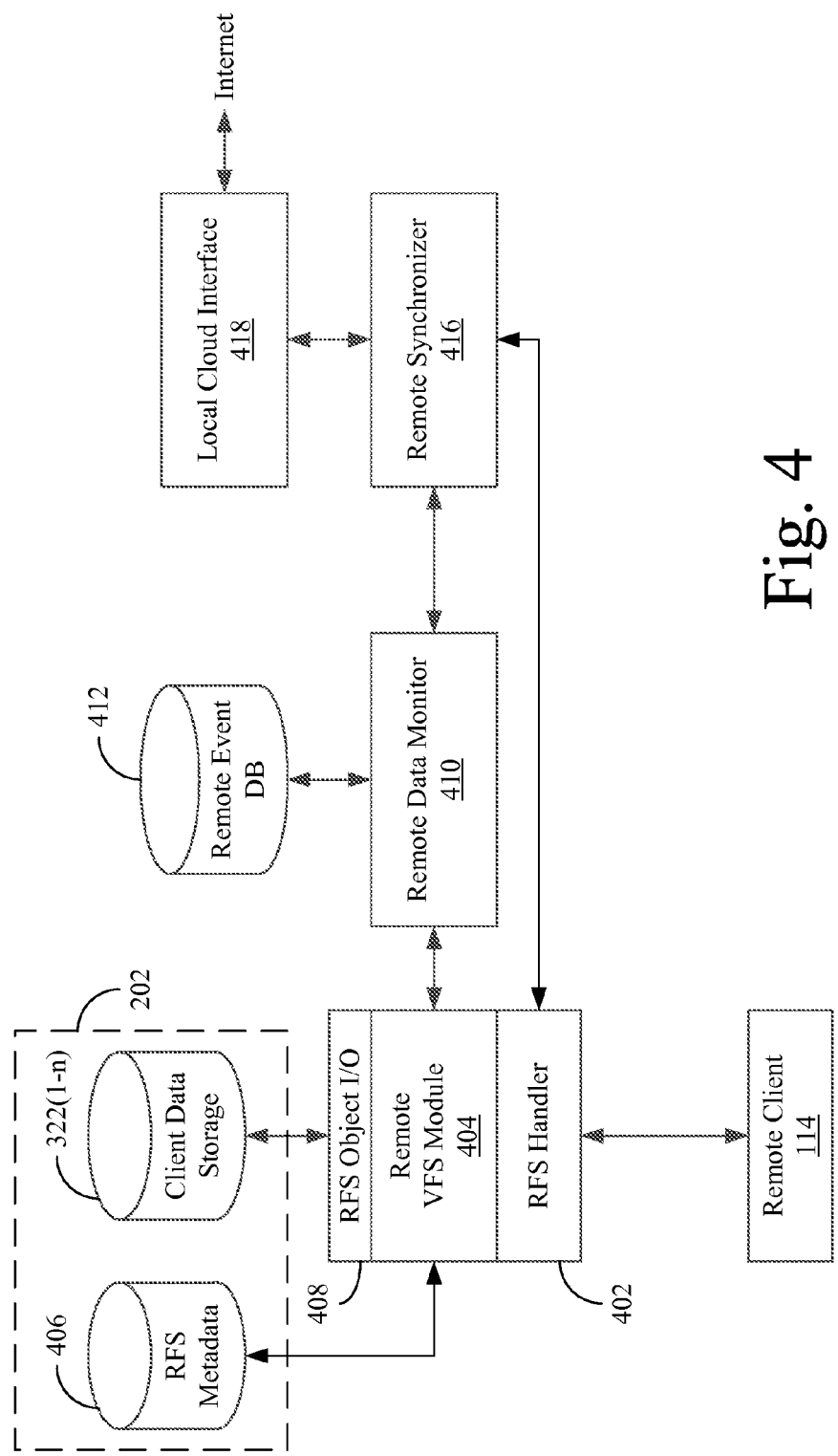
FIG. 4 is a relational diagram of the functional aspects of an architecture for synchronizing local and remote file systems, which is implemented within the remote cloud storage server of FIG. 3.

FIG. 4 is a relational diagram of the functional aspects of an architecture for synchronizing LFS 204 and RFS 202, which is implemented within remote cloud server 102. In the illustrated embodiment, the functional aspects are provided by remote cloud services 312, but the functional elements of the system can be distributed across other service modules or even other machines.

Remote client 114 is a device and/or process used to access files in RFS 202 via an RFS handler 402. Remote clients 114 can connect with RFS handler 402 either via the Internet 106 or via connections 116 (FIG. 1). RFS handler 402 represents an interface/protocol by which remote clients 114 can access and modify RFS 202. For example, RFS handler 402 can be an interface implementing HTTP, WebDAV, and/or FTP protocols, an interface compatible with a mobile application (e.g., an application running on a smart telephone, tablet, etc.), or some other interface with which an application on the remote client 114 can interact. Responsive to a remote client 114 requesting access, file access interface 402 calls remote virtual file system (VFS) module 404.

Remote VFS module 404 is a software plugin that provides remote client 114 with file and folder access to RFS 202. Initially, it should be noted that RFS 202 includes both an RFS metadata database 406 and the associated data objects stored on data storage devices 322(1-n). Metadata database 406 stores metadata (e.g., virtual files, virtual folders, permissions, etc.) that describes a hierarchical, virtual file system via which remote client 114 can access file system objects and make changes to RFS 202. Data storage devices 322(1-n) store data files that are associated with the virtual file system objects defined by the metadata. The metadata in database 406 stores paths to the associated data files on data storage devices 322(1-n), so that file system objects can be accessed, updated, and created on devices 322(1-n) in accordance with changes made by the remote client 114 to virtual RFS 202.

Remote VFS module 404 intercepts the file system calls coming from remote client 114 and enforces cloud permissions on file system access. If access is permitted, remote VFS module 404 utilizes metadata stored in RFS metadata database 406 to provide remote client 114 with a hierarchical virtual file system (e.g., a directory tree view of folders and files) via which the remote client 114 can access and make changes to the file system objects. When a data file needs to be uploaded to, downloaded from, or deleted from client data storage devices 322(1-n), remote VFS module 404 utilizes RFS object I/O module 408 to store the data file.

RFS object I/O module 408 manages the I/O subsystem for organized data file storage and access on data storage devices 322(1-n). Responsive to VFS module 404 and metadata, RFS object I/O module 408 downloads associated data files from, uploads associated data files to, and deletes associated data files from data storage devices 322(1-n). VFS module 404 provides data files to, and retrieves data files from, remote client 114 as needed via RFS handler 402.

In other words, RFS 202 includes a control plane and a data plane. The control plane includes the metadata in RFS metadata database 406, which the remote client 114 can change via the virtual file system. The data storage devices 322(1-n) represents the data plane, which the remote client 114 does not have direct access to or control over. Rather, changes are propagated to the data plane based on changes that the client makes to the virtual file system.

Changes that are made to a file system are called "events". Changes made to RFS 202 specifically are referred to as "remote events", whereas changes made to LFS 204 will be referred to as local events. In the present embodiment, remote events originate as changes to the metadata stored in RFS metadata database 406, for example, as a result of remote client 114 interacting with the virtual file system.

Events include file events and folder events. File events include creating a file (CREATE), updating a file (UPDATE), deleting a file (UNLINK), and renaming a path (RENAME). Because RENAME operates on the path, RENAME can represent both rename events and move events. Additionally, RENAME events are represented from both the source and destination path perspectives. Representing RENAME events in this manner facilitates event processing from both the source and the destination perspectives, as will be described in further detail below. Accordingly, file RENAME events from the source perspective is RENAME_SRC_FILE (RSF) and the file RENAME event from the destination perspective is RENAME_DST_FILE (RDF). Folder events include creating a folder (MKDIR), removing a folder (RMDIR), and renaming a folder. The rename event is represented from both the source perspective (RENAME_SRC_DIR, "RSD") and from the destination perspective (RENAME_DST_DIR, "RDD"). These events will be described in greater detail below.

Remote VFS module 404 facilitates event-based synchronization of RFS 202 and LFS 204 by trapping the remote events as they occur (i.e., when changes are made to the virtual file system) and providing remote event information to a remote data monitor 410. In particular, remote VFS module 404 monitors I/O requests from remote client 114 and provides remote event information to remote data monitor 410 when it receives an I/O request that changes the virtual file system.

For each remote event, remote data monitor 410 receives the remote event information from remote VFS module 404, and then enters a record of the remote event in a remote event database 412. Optionally, remote data monitor 410 can filter irrelevant and/or redundant remote events (e.g., by optionally implementing phase 0-1 processing described below, etc.) from database 412. Additionally, remote data monitor 410 can notify a remote synchronizer 416 of the occurrence of remote events and can receive synchronization commands from remote synchronizer 416. For example, responsive to a request for remote event records from remote synchronizer 416, remote data monitor 410 can retrieve the requested remote event records from remote event database 412 (e.g., for an event sync period) and provide them to remote synchronizer 416. Remote data monitor 410 can also periodically delete the remote event records from remote event database 412, for example, following a command from remote synchronizer 416 following successful event synchronization.

Remote event database 412 provides storage for a plurality of remote event records associated with a plurality of remote events. These events are maintained according to a scalable relational database schema. Records of remote events are stored in remote event database 412 in chronological order. However, as will be described in further detail below, remote event database 412 can return event records chronologically and/or according to the hierarchy of the virtual file system.

Remote synchronizer 416 controls various aspects of the synchronization process between the remote cloud 102 and the local cloud 104 from the remote cloud side. For example, remote synchronizer 416 can receive commands from local cloud 104, via internet 106 and a local cloud interface 418, to initiate synchronization. In response, remote synchronizer 416 can request remote event records from RFS data monitor 410, receive the remote event records, and provide the remote event records to local cloud 104 via local cloud interface 418. In other embodiments, remote synchronizer 416 can periodically provide the remote event records to local cloud 104 without the events being requested by local cloud 104. In still other embodiments, remote synchronizer 416 can contact local cloud 104 via interface 418 and initiate the synchronization process, for example, in response to remote synchronizer 416 receiving notification of a remote event from remote data monitor 410.

Remote synchronizer 416 is also operative to receive file system operations for modifying RFS 202 from local cloud 104 via interface 418 and to provide those file system operations to RFS handler 402. RFS handler 402, in turn, causes the file system operations to be applied to RFS 202. The file system operations represent changes associated with local events that are being applied to the RFS 202 as part of the bidirectional, steady-state synchronization process (FIG. 2B).

File system operations can include any file system operations that are recognized by the protocol(s) implemented by RFS handler 402 (e.g., upload, download, delete, move, create, rename, etc.). The file system operations make changes in RFS metadata database 406 and/or client data stores 322(1-n) as part of the synchronization process. For example, the file system operations can cause a file or folder to be created, deleted, renamed, or moved in the metadata virtual file system. As another example, the file system operations can also result in a file being uploaded, downloaded, moved, renamed, or deleted from the client data stores 322(1-n). File system operations will be discussed in further detail below.

As indicated above, remote synchronizer 416 communicates with local cloud interface 418. Local cloud interface 418 is a means by which remote cloud server 102 can establish an internet connection with local cloud server 104 and intercommunicate as needed. In a particular embodiment, local cloud interface 418 maintains an open (always on) connection with local cloud 104 for efficient event-based synchronization.

Figure 5:
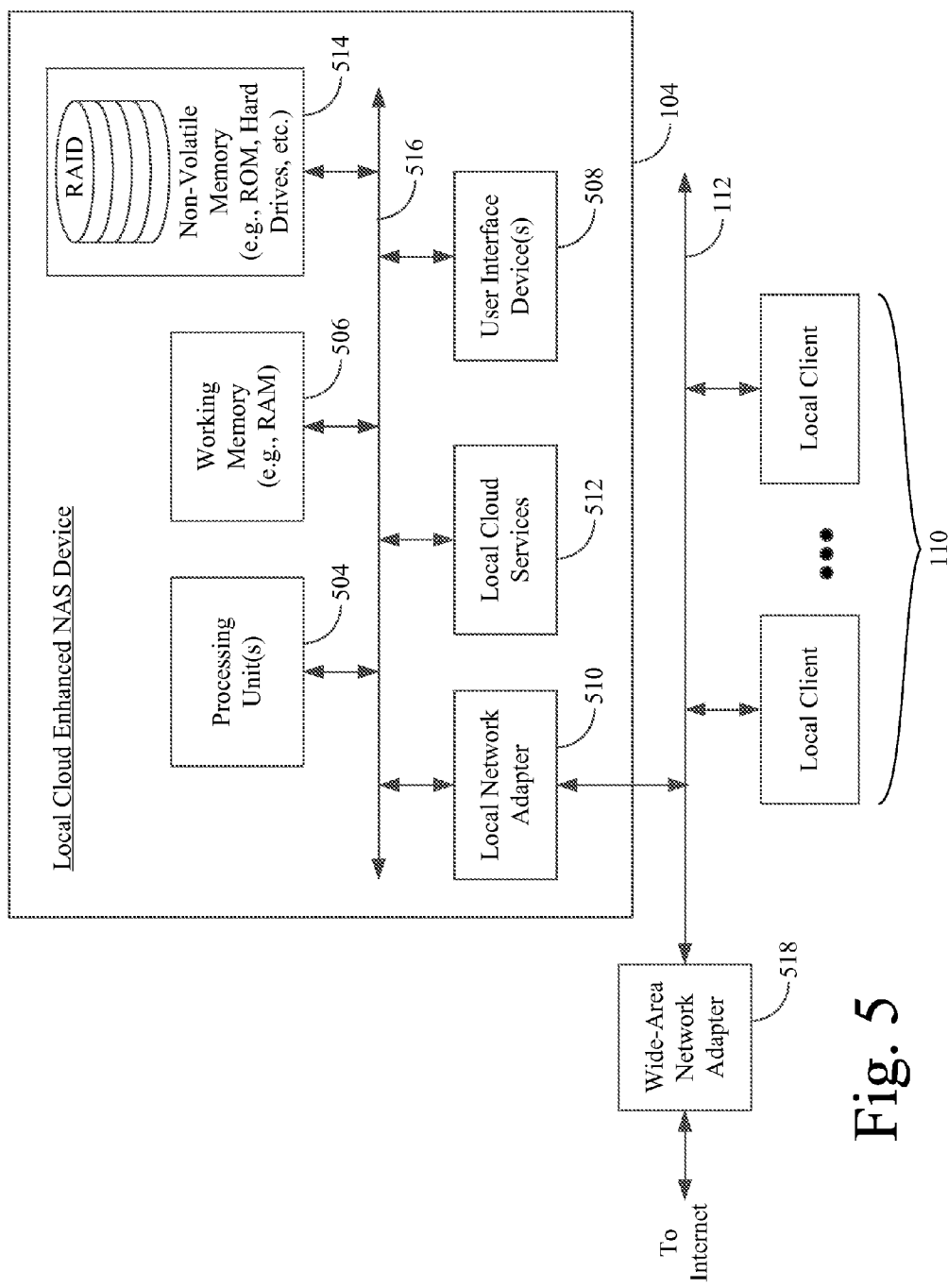
FIG. 5 is a block diagram of a local file storage server.

FIG. 5 is a block diagram showing local cloud server 104 in greater detail. In this particular embodiment, local cloud server 104 is an enhanced network attached storage (NAS) device that includes one or more processing units 504, working memory 506, one or more user interface devices 508, a local network adapter 510, a local cloud services component 512, and non-volatile memory 514, all intercommunicating via an internal bus 516. Processing units(s) 504 impart functionality to local cloud server 104 by executing code stored in any or all of non-volatile memory 514, working memory 506, and local cloud services 512. A wide-area network adapter 518 facilitates communication with remote cloud 102 (FIG. 1) via local network 112 and the Internet 106.

Non-volatile memory 514 also provides local file storage for client files/objects. By way of example, the nonvolatile memory 514 is shown to include (in addition to other types of memory) a set of hard drives arranged in a RAID configuration. The client's file system on the RAID drives can be accessed by local clients 110 via local network 112, as is known in the art.

Local cloud services 512 represents hardware, software, firmware, or some combination thereof, that provides the event-based synchronization functionality described herein. Local cloud services 512 also provide file storage and retrieval services to local clients 110. The file storage functionality of local cloud services 512 will not be described in detail herein, except to the extent it relates to the synchronization aspects, so as not to unnecessarily complicate this disclosure.

Figure 6:
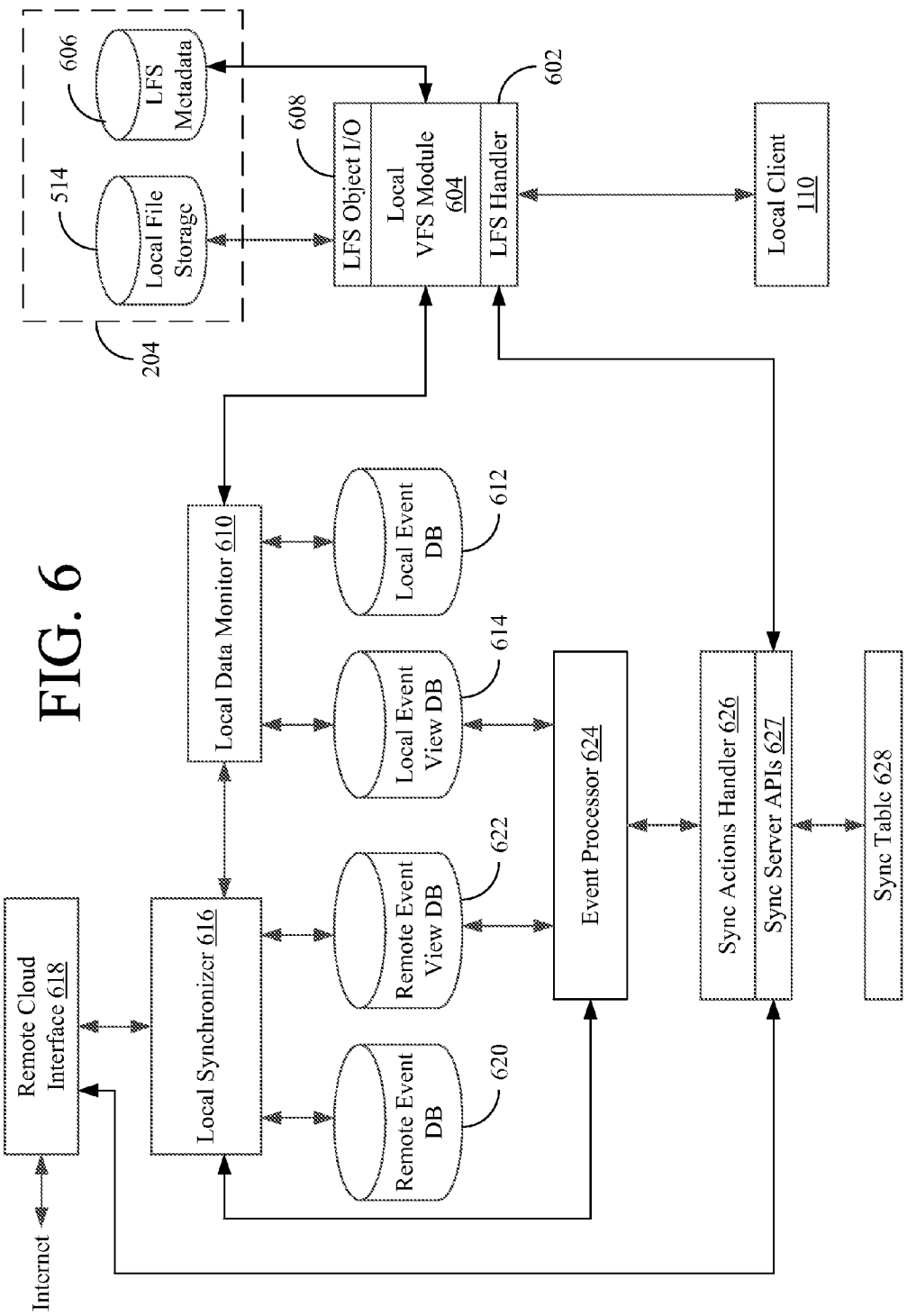
FIG. 6 is a relational diagram of the functional aspects of an architecture for synchronizing local and remote file systems, which is implemented within the local cloud storage server of FIG. 5.

FIG. 6 is a relational diagram of the functional aspects of an architecture for synchronizing LFS 204 and RFS 202, which is implemented within local cloud server 104. In this illustrated embodiment, the functional aspects are provided by local cloud services 512, but the functional elements of the system can be distributed across other service modules or even other machines.

LFS handler 602 receives requests for access (e.g., read requests, write requests, etc.) from local clients 110. In this particular example, clients 110 are WINDOWS® clients, and LFS handler 602 is a server application that includes Samba. (Samba is an open source MS WINDOWS® networking protocol server.) However, the present invention is not limited to these particular examples. Rather, these particular examples, as well as others used in this disclosure, are merely used to provide a clear explanation of the present invention. Indeed, a significant advantage of the present invention is that it can be implemented with a wide variety of server applications and file system protocols (e.g., NFS).

Local client 110 is a device/process used to access the files in LFS 204 hosted by local cloud server 104. A user maps the "Share" that is exported by LFS handler 602 (e.g., via Server Messaging Block (SMB) protocol) and then accesses the files and folders within the exported share. In such an example, Samba could export the files and folders of LFS 204 to external Windows clients via SMB protocol.

Local VFS module 604 is a software plugin that monitors I/O calls to LFS 204 to detect local events (changes) being made to LFS 204, which includes metadata 606 and data files in local file store 514. LFS object I/O module 608 manages the I/O subsystem for organized data file storage and access on LFS 204. In this embodiment, local VFS module 604 does not provide a virtual file system for local client 110. Rather, local VFS module 604 monitors the file system calls going to the local file system form the local client 110 based on the protocol that has been implemented. When local VFS module 604 detects a local event (e.g., a change to LFS 204 made by local client 110), local VFS module 604 executes a trap that generates local event information based on the local event and provides the local event information to local data monitor 610. The types of local events are the same as the types of remote events.

For each local event, local data monitor 610 receives the local event information from local VFS module 604, and then enters a local event record in a local event database 612. Optionally, local data monitor 610 can filter irrelevant and/or redundant local events before entering the local events into database 612 (e.g., by implementing phase 0-1 processing as described below, etc.). Local data monitor 610 can also notify a local synchronizer 616 of a local event and can receive synchronization commands from local synchronizer 616. Local data monitor 610 is also responsible for copying/moving local event records from local event database 612 to a local event view database 614 for synchronization purposes. For example, local data monitor 610 can move only local event records for local events that occurred during an event synchronization period determined by local synchronizer 616.

Local event database 612 provides storage for local event records in a scalable relational database schema. Local event records are stored in local event database 612 in chronological order as local events occur.

Local event view database 614 stores local event records that will be undergoing synchronization. The schema for database 614 is the same as for database 612, such that records stored in database 612 can be easily copied/moved to database 614. Once local data monitor 610 moves the local event records from local database 612 to local event view database 614, the local records in view database 614 are considered being processed for synchronization. Accordingly, local data monitor 610 removes the corresponding local event records from local event database 612. Local event records can be stored in local event view database chronologically, and subsequently accessed therefrom chronologically and/or according to the hierarchy of LFS 204.

Local synchronizer 616 is responsible for driving the synchronization process between the remote cloud 102 and the local cloud 104 in this embodiment. Accordingly, local synchronizer 616 is responsible for periodically initiating synchronization, which it can do in a variety of ways. For example, local synchronizer 616 can initiate synchronization whenever local data monitor 610 notifies it of a local event occurring. As another example, local synchronizer 616 can initiate synchronization periodically, for example, according to a time period defined by the client or by the system (e.g., every minute, every 15 minutes, etc.). As still another example, local synchronizer 616 can initiate synchronization upon receiving one or more remote event records from remote cloud 102, for example, via an open (e.g., always on) connection established over internet 106 between local cloud interface 418 (FIG. 4) and a remote cloud interface 618. These and other methods by which local synchronizer 616 can initiate synchronization will be apparent in view of this disclosure.

Local synchronizer 616 is also responsible for receiving (and optionally requesting) remote event records from remote cloud 102 over internet 106. When remote event records are received, local synchronizer stores the remote event records in a remote event database 620. In an alternative embodiment, only remote event information needs to be received from remote cloud 102, and new remote event records can be generated by remote event database 620. In the present embodiment, however, it will be assumed that local synchronizer 616 receives remote event records (e.g., in a table format, etc.) and stores them in remote event database 620.

In response to initiating synchronization, local synchronizer 616 copies at least some of the remote event records (e.g., those associated with an event sync period) from remote event database 620 to a remote event view database 622. Local synchronizer 616 then causes remote event database 620 to purge the copied remote event records therefrom. The schemas for remote databases 412, 620, and 622 are the same in the present embodiment.

Local synchronizer 616 also intercommunicates with an event processor 624. In particular, local synchronizer 616 can instruct event processor 624 to begin event processing, which will result in file system operations being generated based on the local and remote events stored in view databases 614 and 622. In some embodiments, local synchronizer 616 also receives communications from event processor 624. For example, event processor 624 can notify synchronizer 616 that event processing is completed for a current event sync period. In other embodiments, event processor 624 might also provide file system operations to local synchronizer 616.

Event processor 624 carries out event-based processing on the local event records and remote event records stored in local event view database 614 and remote event view database 622, respectively. As will be described in further detail below, event processor 624 is operative to query local event view database 614 and the remote event view database 622 for local event records and remote event records, respectively. Event processor 624 then processes the returned local and remote event records into processed event records and uses the processed event records to generate file system operations that will synchronize RFS 202 and LFS 204 as of the end time ($T_2$) of the current event synchronization period, once the file system actions are applied to the appropriate file systems. Event processor 624 outputs the generated file system operations to sync actions handler 626. Optionally, event processor 624 could provide the operations to synchronizer 616 prior to the operations being provided to sync actions handler 626.

Sync actions handler 626 receives the file system operations and applies the file system operations to RFS 202 and LFS 204 using a set of sync server application program interfaces (APIs) 627. The sync server APIs 627 enable sync actions handler 626 to apply file system operations on LFS 204 via LFS handler 602. The APIs 627 also enable sync actions handler 626 to perform file system operations on RFS 202 remotely via remote cloud interface 618, internet 106, local cloud interface 418 (FIG. 4) and remote synchronizer 416 (FIG. 4). Remote synchronizer 416 in turn applies, for example using complementary APIs, the received file system operations to RFS 202 via RFS handler 402. File system operations that can be applied to RFS 202 and LFS 204 via the sync server APIs 627 include, but are not limited to, pushing (uploading) files and folders, pulling (downloading) files and folders, creating files and folders, moving files and folders, deleting files and folders, renaming files and folders, and FRS and LRS synchronization processes. If sync actions handler 626 receives an FRS or LRS operation, sync actions handler 626 is operative to utilize APIs 627 to acquire metadata snapshots of the target paths on LFS 204 and RFS 202 via LFS handler 602 and RFS handler 402 (via Internet 106), respectively, and then bi-directionally resynchronize the target paths on each of LFS 204 and RFS 202. Finally, it should be noted that sync actions handler 626 can optionally use different APIs depending on the number of file system operations that have to be applied, the number of files that have to be transmitted, the size of the files that have to be transmitted, etc.

Sync actions handler 626, via APIs 627, has the additional function of updating sync table 628 as paths are synchronized. Sync table 628 store the path of every file system path that has been synchronized in LFS 204 and RFS 202. Once paths are synchronized, sync actions handler 626 will utilize the APIs 627 to update sync table 628.

Once the file system actions generated by event processor 624 have been applied to RFS 202 and LFS 204, RFS 202 and LFS 204 are synchronized as of the end of the event synchronization period ($T_2$). Thus, RFS 202 and LFS 204 can be efficiently and repeatedly synchronized by monitoring local and remote file systems for local and remote events, and then applying those events to the other file system. The inventors have found that this event-based synchronization process scales well to file systems uses fewer system resources. Moreover, because event-based synchronization can be performed often (e.g., at periods of a minute or less), the invention provides near steady-state synchronization between the RFS 202 and LFS 204.

As will be apparent from the description thus far, the steady-state synchronization process is primarily implemented and controlled by the local cloud server 104. However, the functional elements of the remote cloud 102 (FIG. 4) and the local cloud 104 (FIG. 6) could be reversed, such that the remote cloud primarily implements the steady-state synchronization. As another example, the functional elements of the local cloud 104 (FIG. 6) could be replicated on the remote cloud 102, such that either server could carry out the particular functions of steady-state synchronization as desired.

Figure 7:
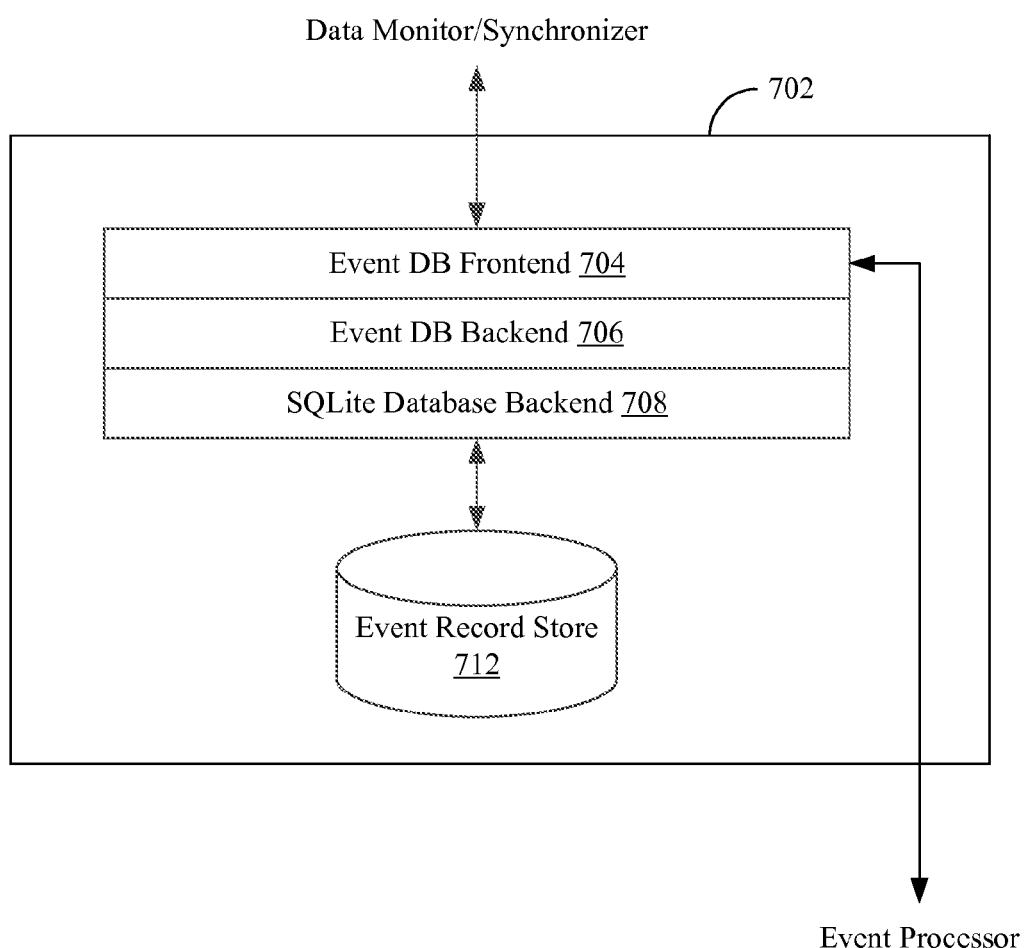
FIG. 7 is a relational diagram of the functional aspects of an event database according to the present invention.

FIG. 7 is a block diagram of the functional aspects of an exemplary event database 702 according to the present invention. Event database 702 can be employed as any of event databases 412, 612-614, and 620-622 shown in FIGS. 4 and 6. Event database 702 includes an event frontend 704, an event backend 706, an SQLite database backend 708, and an event record store 712.

Event frontend 704 provides an interface for event database 702 to interact with a data monitor 410/610, local synchronizer 616, and/or event processor 624. Event frontend 704 receives event information for new events and, in response, calls event backend 706 to create new records in response to each event notification. Event frontend 704 can also receive event records (e.g., in table format, etc.) and call event backend 706 to store the event records. Event frontend 704 also receives queries for event records from event processor 624 and is operative to retrieve the requested data from event backend 706 and provide the data to event processor 624. Event frontend 704 permits events to be stored in event record store 712 in chronological order, and optionally can export records associated with events chronologically and/or according to the hierarchy of either RFS 202 and LFS 204.

Event backend 706 creates, stores, and retrieves records to and from event record store 712 using, in this embodiment, an SQLite database backend 708. SQLite database backend 708 is a self-contained, scalable, embedded database useful for event storage. As another option, database 702 could employ a flat file backend to facilitate encoding the database model as a single file.

To create a record of an event, event backend 706 receives event information from event frontend 704 and calls SQLite database backend 708 to create and store the record(s) for that event in event record store 712. Additionally, responsive to a query from event frontend 704, event backend 706 is operative to retrieve records from event record store 712 (via SQLite backend 708) and provide those records to event frontend 704. Event frontend 704, in turn, provides the event records to the requesting entity, such as data monitor 410/610, synchronizer 616, or event processor 624. In a particular embodiment, the query requests records for events associated with a particular time period.

Figure 8:
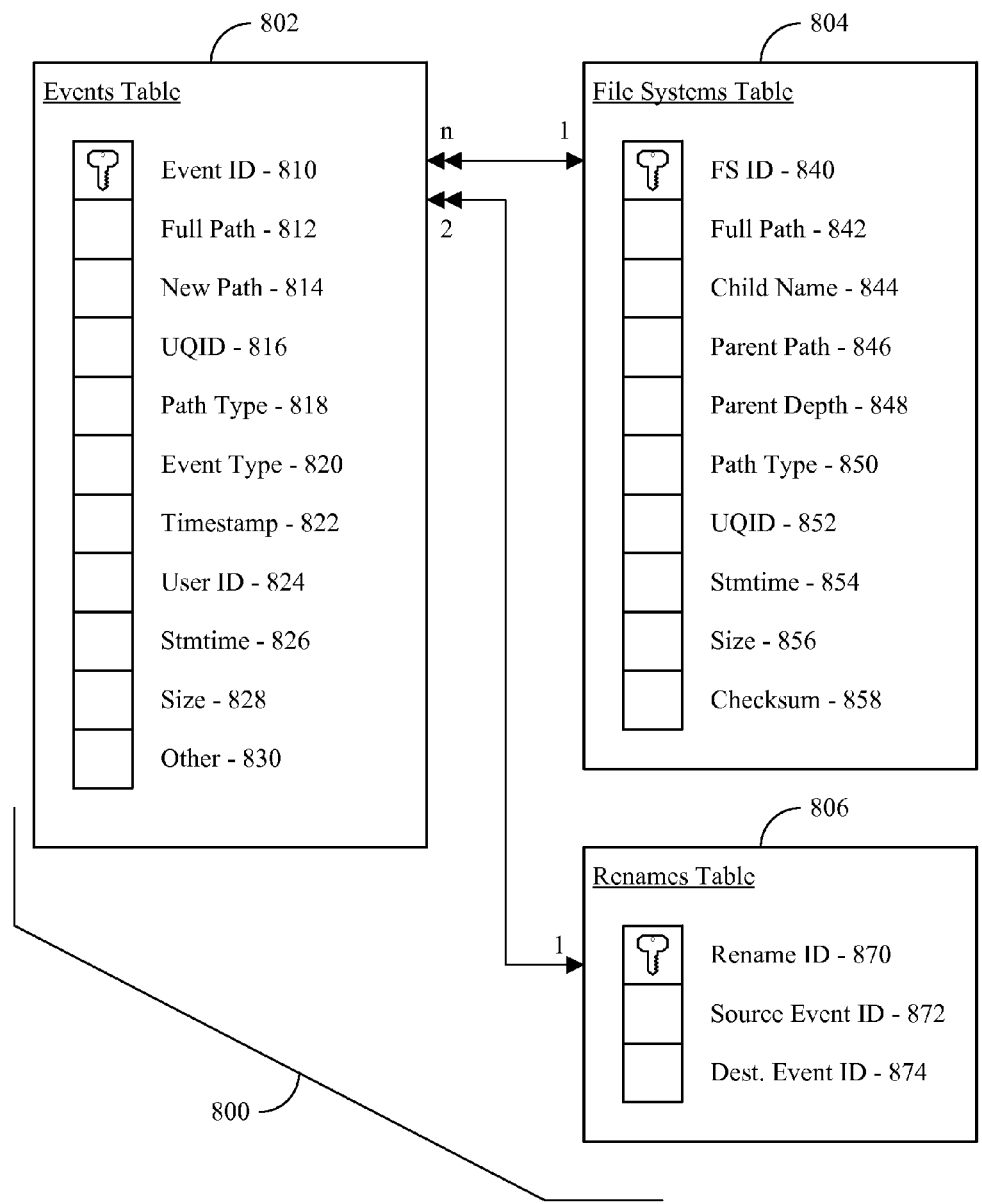
FIG. 8 shows the schema for the event database of FIG. 7.

FIG. 8 shows a database schema 800 for event database 702 according to the present invention. Schema 800 includes an events table 802, a file systems table 804, and a renames table 806.

Each event record in Events table 802 includes an Event ID field 810, a Full Path field 812, a New Path field 814, a UQID field 816, a Path Type field 818, an Event Type field 820, a Timestamp field 822, a User ID field 824, a Stmtime field 826, a Size field 828, and a Flags field 830. A record is created in Events table 802 for each event that occurs in an associated file system other than rename events. For rename events (file or folder), two event records 802 are created: one from the source path perspective and one from the destination path perspective.

Event ID 810 is a key field of events table 802 and includes data uniquely identifying each event record 802. Event ID 810 is assigned by the database (e.g., by SQLite backend 708). Full Path 812 field includes data indicating the path of the file system object on which the event occurred. For RENAME events full path field 812 for the source event record will include the source path, whereas field 812 will include the destination path for the destination event record. Thus, path information can be accessed from both rename path perspectives.

New Path field 814 includes data indicating the new path assigned when an event occurred. UQID field 816 includes data uniquely identifying the file system object in the RFS 202. The UQID field can be used, for example, to identify the same file system objects on different file systems (e.g., RFS 202 and LFS 204) and/or associate a virtual file system object (e.g., in metadata database 406) with the data file in the data store (e.g., in client data store 322). Path Type field 818 includes data (e.g., a flag) indicating if the event record is associated with a file or a folder. Event Type field 820 includes data indicating the type of event (e.g., CREATE, UPDATE, UNLINK, RENAME_SRC_FILE, RENAME_DST_FILE, MKDIR, RMDIR, RENAME_SRC_DIR, RENAME_DST_DIR) that the event record is associated with. Timestamp field 822 includes data indicating the time the event occurred. User ID field 824 include data identifying the user that caused the event. Stmtime field 826 includes data indicating the time when the event on the associated file system object was completed. Size field 828 includes data indicating the size of a data file associated with the file system object. Size field 828 is set to zero (0) when the associated file system object is a folder. Other field 830 includes other data that might be useful during event processing (e.g., error information, reduction status, feedback, etc.).

Each record in File Systems table 804 includes a File System (FS) ID field 840, a Full Path field, 842, a Child Name field 844, a Parent Path field 846, a Parent Depth field 848, a Path type field 850, a UQID field 852, a Stmtime field 854, a Size field 856, and a Checksum field 858. A record is created in File Systems table 804 for each file system path on which an event occurred. As shown in FIG. 8, there is a many-to-one relationship between records in Events table 802 and records in File Systems table 804, such that many events can happen on one file system path. Storing the file system paths on which events occurred facilitates event processing as will be described below.

File System (FS) ID field 840 is the key field of File Systems table 804 and includes data uniquely identifying a file systems record. Child Name field 844 includes data representing the name of a child file system object to the path contained in Full Path field 842. Parent Path field 846 includes data representing the parent path of the path represented in Full Path 842. Parent Depth field 848 includes data indicating the depth of the path stored in Parent Path field 846. Finally, Checksum field 858 includes a checksum for the file system object located at the path defined by full path field 842. The checksum value is useful for comparison during synchronization when the full path 842 points to a file. Full Path field 842, Path Type field 850, UQID field 852, Stmtime field 854, and Size field 856 contain the same data as Full Path field 812, Path Type field 818, UQID field 816, Stmtime field 826, and Size field 828, respectively, of Events table 802. However, Stmtime field 854 can contains data indicating the time when the last event on the associated file system path was completed.

Records are stored in Renames table for all rename events. Recall that rename events encompass both rename events and move events on file system objects. Each record in Renames table 806 includes a Rename ID field 870, a Source Event ID field 872, and a Destination Event ID field 874. As is apparent from FIG. 8, there is a two-to-one relationship between records in Events table 802 and records in Renames table 806. Thus, two event records in Events table 802 (source and destination) are associated with each record in Renames table 806.

Rename ID field 870 is the key field of Renames table 806 and include data uniquely identifying each rename record. Source Event ID field 872 contains data representing an Event ID identifying the source event record for the rename event. The source event record provides a record of the rename event from the perspective of the source path of the file or directory. Destination Event ID field 874 contains data representing an Event ID identifying the destination event record for the rename event. The destination event record provides a record of the rename event from the perspective of the destination path of the file or directory.

The following exemplary queries can be used to insert contents into the event database 702. To add an event record to Event table 802, the following query can be used:

```
add_event_query = u'''
    insert into event
        (full_path, new_path, uqid, path_type, event_type, timestamp,
        user_id, stmtime, size, flags)
    values
        (X1, X2, X3, X4, X5, X6, X7, X8, X9, X10)
'''
```

To add a file system record to File Systems table 804, the following query can be used:

```
file_system_query = u'''
    insert or replace into file_system
        (full_path, child_name, parent_path, parent_depth, path_type,
        uqid, stmtime, size, checksum)
    values
        (Y1, Y2, Y3, Y4, Y5, Y6, Y7, Y8, Y9)
'''
```

To add a rename record to Renames table 806, the following query can be used:

```
rename_event_query = u'''
    insert into rename_event
        (source_event_id, destination_event_id)
    values
        (Z1, Z2)
'''
```

Figure 9:
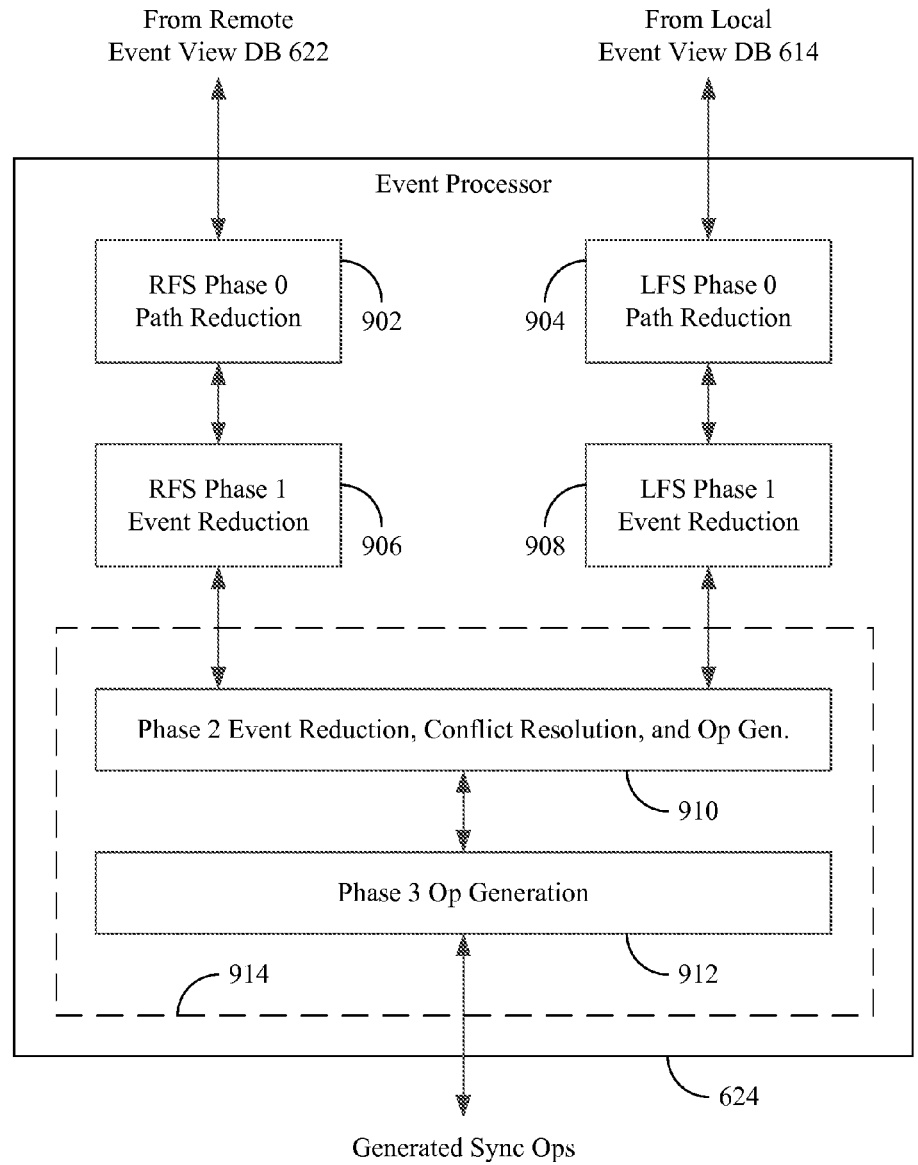
FIG. 9 is a relational diagram of the functional aspects of the event processor of FIG. 6.

FIG. 9 is a block diagram showing the functional aspects of event processor 624 in greater detail. Event processor 624 includes a series of processes (Phase 0 to Phase 3) that reduce, modify, and coalesce the LFS and RFS events. The processed set of LFS and RFS events are then used to generate file system operations that can be applied to RFS 202 and LFS 204. After the file system operations are applied to RFS 202 and LFS 204, the file systems will be synchronized as of the end of the event synchronization period.

Event processor 624 includes an RFS phase 0 module 902, an LFS phase 0 module 904, an RFS phase 1 module 906, and an LFS phase 1 module 908. Event processor 624 also includes a phase 2 module 910 and a phase 3 module 912. The modules of event processor 624 have read/write/modify access to the records (event records, file system records, and rename records) in remote event view database 622 and in local event view database 614, for example, via respective event frontends 704. Alternatively, the records in view databases 622 and 614 can be cached for quicker access.

RFS phase 0 module 902 accesses the remote event records 802, file system records 804, and rename records 806 of remote event view database 622 and performs various path reduction and modification processes to the remote event records 802. Subsequently, RFS Phase 1 module 906 accesses the remote event records, file system records, and rename records, as modified by phase 0 module 902, and performs further reduction of the remote event records 802. RFS phase 1 module 906 can utilize a set of look-up tables to determine how the number of remote event records 802 can be reduced further. LFS phase 0 module 904 and LFS phase 1 module 908 operate substantially the same on the local event records, file system records, and rename records of local event view database 614.

As shown in FIG. 9, the phase 0 and phase 1 processes are performed on local event records and remote event records independently. The RFS and LFS phase 0 and phase 1 processes are shown separately for clarity, but these modules can be combined into single phase 0 and phase 1 modules if desired, as long as the local and remote event records are processed independently of each other during phase 0 and phase 1.

The modified local event records and modified remote event records produced by phase 0 and phase 1 processing are combined and processed further by phase 2 module 910. Phase 2 module 910 can reduce the remote event records and local event records even further. Additionally, phase 2 module 910 compares local and remote events that occur on common file system object paths in LFS 204 and RFS 202, and resolves conflicts (if any) between the local and remote events. In a particular embodiment, phase 2 module 910 utilizes a series of lookup tables and APIs to resolve LFS-RFS event conflicts. As part of the conflict resolution process, phase 2 module 910 generates file system operations that, when applied to RFS 202 and/or LFS 204, implement the conflict resolution.

Phase 3 module 912 is utilized to generate file system operations based on the remaining local and remote event records. Because phase 2 module 910 and phase 3 module 912 both generate file system operations to be applied to RFS 202 and LFS 204, modules 910 and 912 can also be perceived as a single module 914 and their respective functions can be implemented in combination.

Phase 0 event processing will now be described in greater detail. Phase 0 processing is based on the types of events that the event records are associated with. In particular, phase 0 processing is based on RENAME events and RMDIR events. Phase 0 event processing (1) adjusts path prefixes relevant to folder and file renames, and (2) removes events that happened within a deleted folder as these events are no longer relevant.

Phase 0 path modification is carried out on events that happened on a path that changed at some time. The events whose paths are being modified will have a temporal precedence with regard to the event that necessitated the path modifications. Usually, the event records being modified are those that occurred on the path prior to the rename event. All the events that happened after the rename event remain unchanged. The following are two examples of phase 0 path modifications for RENAME:

(1) UPDATE /A/b.txt+RENAME /A to /B=RENAME /A to /B+UPDATE /B/b.txt
(2) RENAME /A/B/c.txt to /A/B/C/d.txt+RENAME /A to /X=RENAME /A to /X+RENAME /X/B/c.txt to /X/B/C/d.txt In example (1), two events previously made to one file system (e.g., RFS 202) are shown on the left hand side (LHS) of the equation, and two modified events are shown on the right hand side (RHS) of the equation. On the LHS, an update event is followed by a rename event. Phase 0 module 902 modifies the LHS events as shown on the RHS. In particular, phase 0 module 902 chronologically moves the rename event ahead of the update event and moves the update event after the rename event, for example by modifying timestamp field 822 in the event records. Phase 0 module 902 also modifies the path field 812 in the UPDATE event to reflect the new path. Thus, if the events on the RHS of example (1) were applied to a second file system (e.g., LFS 202), the second file system would be synchronized with the first file system.

In example (2), the two events on the LHS have been made to a first file system. In particular, a file "c.txt" has been renamed to "d.txt" and moved to a new director by the first RENAME event. Note that the file RENAME event accomplishes both the rename and move tasks. The second RENAME changes the name of the /A directory to the /X directory. Phase 0 module 902 modifies these events by chronologically moving the folder RENAME event in ahead of the file RENAME event. Phase 0 module also modifies the paths for the file rename event records to reflect the prior folder RENAME event. Thus, if the events on the RHS of example (2) were applied to a second file system, the second file system would be synchronized with the first file system.

The following is exemplary pseudo-code for a phase 0 path modification algorithm.

```
for each rename_event in all RENAME events:
    reduce_timestamp = timestamp(rename_event)
    next_timestamp = reduce_timestamp + 1
    reduce_path = src_path(rename_event)
    translate_path = dst_path(rename_event)
    for event in all events sorted by timestamp:
        if event is DIR event: continue
        if event is UNLINK event: continue
        if event does NOT start with reduce_path: continue
        if timestamp(event) > reduce_timestamp: break
        if rename_event is a FILE event:
            if event is not a CREATE or UPDATE event: continue
            if path(event) != reduce_path: continue
        event.replace(reduce_path with translate_path)
        event.timestamp = next_timestamp
```

Phase 0 module 902 performs the above algorithm for each rename event record in Renames table 806 (line 1). The algorithm determines when the rename even occurred and defines a subsequent time. The algorithm also determines the source path (e.g., /A in example 1) and the destination path (e.g., /B in example 1). Then, via the nested FOR loop, phase 0 module 902 checks all the event records in table 802 in chronological order. Module 902 determines the ones of the other event records containing the source path, and modifies those records that occurred before the rename event with the destination path. The algorithm also modifies the timestamps of those events such that they occur after the rename event.

Phase 0 module 902 also checks for RMDIR (remove directory) events and deletes event records that are no longer relevant in view of the RMDIR event. An example of this process is shown below:

(1) CREATE /A/a.txt+MKDIR /A/B+CREATE /A/B/c.txt+RMDIR A=RMDIR A

On the LHS of the example, three events occur on folder A and then folder A is deleted in a first file system. Accordingly, phase 0 module 902 deletes the three events occurring before the RMDIR A event. Thus, the only remaining event on the RHS is RMDIR A. When RMDIR A is applied to a second file system, the first and second file systems will be synchronized (without a folder A). The following is pseudo-code for implementing this event reduction:

```
for rmdir_event in all events:
    rmdir_path = path(rmdir_event)
    rmdir_timestamp = timestamp(rmdir_event)
```

```
for event in all events sorted by timestamp:
    if timestamp(event) > rmdir_timestamp: break
    if path(event) starts with rmdir_path: remove(event)
```

The above algorithm searches the event records in table 802 and returns each RMDIR event. For each RMDIR event, the algorithm determines the removed folder and the timestamp for the RMDIR event. Then, the algorithm searches through all events in table 802 by timestamp. If the event's timestamp is later than the timestamp of the RMDIR event, then the event record is left alone. However, if the event's timestamp is before that of the RMDIR event and if the event's path field 812 starts with or is a child of the deleted folder, then the event is removed.

Based on the above processes, phase 0 module 902 modifies paths and reduces remote event records. Phase 0 module 904 modifies paths and reduces local event records in substantially the same manner, as indicated previously.

Following phase 0 modification and reduction, RFS phase 1 module 906 performs event reduction and modification on redundant remote event records. Phase 1 event processing reduces consecutive and redundant events that happened on the same file system object path. The following are some examples:

(1) CREATE a.txt+UPDATE a.txt+UPDATE a.txt=CREATE a.txt.
(2) CREATE /A/a.txt+UNLINK /A/a.txt=NONE
(3) RENAME /A to /B+RENAME /B to /C=RENAME /A to /C
(4) RENAME /A to /B+RMDIR /B=RMDIR /A In example (1), the common file system object is a.txt. On the LHS, a.txt is created and then updated twice. RFS phase 1 module 906 compresses these three events to one CREATE event on the RHS. In other words, the update events are removed from the events table 802. This CREATE event will cause a.txt, in its most recent form, to be created on LFS 204.

In example (2), the common file system object is a.txt. On the LHS, a.txt is created and then deleted. Therefore, no action needs to be taken on the RHS (e.g., at the LFS 204), and RFS phase 1 module 906 deletes the CREATE and UNLINK events from the events table 802.

In example (3), the common file system object is folder /B. On the LHS, folder /A is renamed to folder /B and then folder /B is renamed to folder /C. RFS phase 1 module 906 reduces these two events to a RENAME event from folder /A to folder /C. The intermediate rename event to folder /B can be eliminated. Folder /A will be renamed to folder /C on LFS 204.

In example (4), the common file system object is folder /B. On the LHS, folder /A is renamed to folder /B. Then, folder /B is deleted. RFS phase 1 module 906 reduces these two events to RMDIR /A on the RHS. When RMDIR /A is applied to LFS 204, folder /A will be removed from LFS 204.

RFS phase 1 module 906 operates as follows. When phase 1 reduction begins, RFS phase 1 module 906 loops through the file system paths in file systems table 804. For each file system path record in table 804, retrieves the associated event records in events table 802 that occurred on that path and analyzes them in chronological order according to timestamp (timestamp field 822). For each two consecutive event records, RFS phase 1 module 906 utilizes a reduction API to access tables (FIGS. 10A-10D) to determine the appropriate event reduction. RFS phase 1 module 906 determines the appropriate event reduction and modifies Events table 802 accordingly. Thus, the size of Events table can decrease as phase 1 progresses. Each reduced remote event record can then be used for a next event reduction determination on that file system path. Once all event reductions for events on a particular path are complete, RFS phase 1 module 906 moves to the next file system path in table 804 and repeats the reduction process. When all file system paths have been processed, phase 1 reduction is complete.

The following is exemplary pseudo-code that implements phase 1 reduction.

```
reduce_events_for_path(event_list):
    path_list_to_reduce_events = empty_list
    for event in event_list:
        nreduced_events, path_list =
            reduce_two_events(event, event.next)
        if path_list: path_list_to_reduce_events.extend(path_list)
    return path_list_to_reduce_events
reduce_events(path_list):
    for path in all paths for which there are events:
        path_list_to_reduce_events =
            reduce_events_for_path(event_list(path))
path_list = reduce_events(all_paths)
while path_list is NOT empty:
    path_list = reduce_events(path_list)
```

LFS phase 1 module 908 operates substantially the same as RFS phase 1 module 906, except that it operates on the local events from view database 614 as previously modified by phase 0 module 904. Optionally, RFS and LFS phase 1 modules 906 and 908 can be combined into a single module that performs phase 1 reduction, independently, on the remote event records and the local event records.

FIGS. 10A-10D show event reduction tables employed during the phase 1 reduction process to determine the appropriate event reductions (if any). These tables indicate operations performed on consecutive events (at times T and T+1) that occur on the same file system object path.

FIG. 10A shows a File/File event reduction table 1002. The phase 1 reduction module utilizes table 1002 if the two consecutive events in question are file events. The data in Path Type field 818 in the event records will indicate if an event record is associated with a folder or a file. In table 1002, the columns 1004-1012 indicate file event types for the file event happening at time (T), whereas the rows 1014-1022 indicate file event types for the consecutive file event happening at time (T+1). Time (T) and (T+1) can be based on the timestamps in fields 822 or the timestamps in Stmtime fields 826 as desired.

File event types for a file event occurring at time (T) include CREATE 1004, UPDATE 1006, UNLINK 1008, RENAME_SRC_FILE (RSF) 1010, and RENAME_DST_FILE (RDF) from a second source (SRC2). Possible event types for a file event occurring at time (T+1) include CREATE 1014, UPDATE 1016, UNLINK 1018, RSF to a second destination (DST2) 1020, and RDF. The intersection of the rows and columns in table 1002 provide the event reduction (if any) for the two particular events to the phase 1 reduction process.

Some column-and-row intersections in table 1002 indicate a Dirty Event State (DES). A DES indicates that the succession of the two events should not happen. For example, the same file should not be created at times (T) and (T+1). Accordingly, the intersection of column 1004 and row 1014 indicates DES. The same is true for other combinations of events. If a DES state occurs, the phase 1 process can optionally log that the DES occurred, for example in the associated Other fields 830.

Some other intersections indicate that no reduction is possible (NR). In these cases, the phase 1 process would move on from the particular event combination to the next event combination. Conversely, the intersection of column 1004 and row 1018 indicates to reduce events (RE). This combination of events corresponds to example 2 described above, and the phase 1 reduction process can reduce these two events.

Other intersections in table 1002 indicate particular reductions. For example, the intersection of column 1004 (CREATE) and row 1016 (UPDATE) can be reduced to CREATE event with a timestamp corresponding to the UPDATE event 1016. Similarly, the intersection of column 1004 (CREATE) and row 1020 (RSF to DST2) can be reduced to a CREATE DST2 event. The intersection of column 1006 (UPDATE) and row 1016 (UPDATE) can be reduced to a single UPDATE that corresponds to the second (T+1) update. The intersection of column 1008 (UNLINK) and row 1014 (CREATE) can be reduced to a single UPDATE event. Furthermore, the intersection of column 1012 (RDF from SRC2) and column 1018 (UNLINK) can be reduced to an UNLINL SRC 2 event. The intersection of column 1012 (RDF from SRC2) and column 1020 (RSF to DST2) can be reduced to RENAME_SRC_FILE to DST2. Finally, the intersection of column 1012 (RDF from SRC2) and row 1022 (RDF) can be reduced to Unlink SRC2 and RDF. For example, RENAME /A/a.txt to /A/b.txt+RENAME /A/b.txt to A/c.txt reduces to UNLINK /A/a.txt+RENAME /A/b.txt to /A/c.txt. Event records are reduced because a RENAME event (2 event records) is replaced with an UNLINK event (1 event record).

FIG. 10B shows a File/Directory event reduction table 1024, which is utilized when the event at time (T) is a file event and the event at time (T+1) is a folder event. Columns 1026-1034 correspond to the available file events, whereas rows 1038-1042 correspond to the folder events. The folder events include MKDIR, RMDIR, RENAME_SRC_DIR (RSD), AND RENAME_DST_DIR (RDD). Each combination of events in table 1024 results in either a DES or NR. Accordingly, for DES results, the phase 1 process logs the DES. Otherwise, the phase 1 process moves to the next set of event records.

FIG. 10C shows a Directory/File event reduction table 1044, which is utilized when the event at time (T) is a folder event and the event at time (T+1) is a file event. Columns 1046-1052 correspond to the folder events, whereas rows 1054-1062 correspond to the file events. Each combination of events in table 1044 results in either a DES or NR. Accordingly, for a DES result, the phase 1 process logs the DES. Otherwise, the phase 1 process moves to the next set of event records.

FIG. 10D shows a Directory/Directory event reduction table 1064, which is utilized when the event at time (T) is a folder event and the event at time (T+1) is also a folder event. Columns 1066-1072 and rows 1074-1080 correspond to the folder events. Many of the combinations in table 1064 result in DES and NR. The intersection of column 1066 (MKDIR) and row 1076 (RMDIR) results in a reduce events. In such a case, the phase 1 process would remove the MKDIR and RMDIR events from the associated events table 802.

The intersection of column 1072 (RDD) and row 1076 (RMDIR) indicates that an RDD event at time (T) and an RSD event at time (T+1) can be reduced to RMDIR SRC. This is similar to Example 4 given above. The intersection of column 1072 (RDD) and row 1078 (RSD) indicates that an RDD at time (T) event followed by an RSD event at time (T+1) reduces to RSD SRC1 to DST 2. This is similar to Example 3 given above.

Returning now to FIG. 9, after phase 0 and phase 1 processing, the remote records associated with RFS 202 and the local event records associated with LFS 204 are merged and processed jointly by the phase 2 module 910 according to file system object path. The phase 2 module 910 reduces remote and local events associated with the same file system object, resolves conflicts between local and remote events on the same file system object, and generates file system operations according to the conflict resolution.

The phase 2 module 910 reduces local and remote events only in the following three cases:
(1) LFS MKDIR A+RFS MKDIR A=NONE
(2) LFS RMDIR A+RFS RMDIR A=NONE
(3) LFS UNLINK A+RFS UNLINK A=NONE In each of the three cases above, the same folder is made or deleted, or the same file is deleted, on both the LFS 204 and the RFS 202. Therefore, phase 2 module 910 is able to remove the event records for these events.

The phase 2 module 910 has another important function in that it resolves conflicts between local and remote events that happen on a common file system object. A conflict happens when file system operations on any specific path does not leave the event stream in a consistent state. To resolve these conflicts, phase 2 module 910 utilizes conflict resolution look-up tables.

FIGS. 11A-11D define conflict resolution tables that phase 2 module 910 uses to resolve conflicts. The tables define file system operations at the intersections of the conflicting RFS and LFS events that will resolve the conflict.

FIG. 11A shows a table 1102 for resolving conflicts between RFS file events and LFS file events. The RFS file events include CREATE file A in column 1104, UPDATE A in column 1106, UNLINK A in column 1108, RENAME_SRC_FILE A TO C in column 1110, and RENAME_DST_FILE C to A in column 1112. The LFS file events include CREATE file A in row 1114, UPDATE A in row 1116, UNLINK A in row 1118, RENAME_SRC_FILE A TO B in row 1120, and RENAME_DST_FILE C to A in row 1122.

The following are examples of conflict resolution provided by table 1102. The intersection of column 1104 (RFS CREATE A) and row 1114 (LFS CREATE A) indicates an operation "Pull A". The "pull" operation represents both a push to the RFS 202 and a pull to the LFS 204. Accordingly, "Pull A" will result in the LFS file A being pushed to RFS 202 and the RFS file A being pulled to the LFS 204. Optionally, because LFS file A is pushed to RFS 202, the RFS file A can be stored as a prior version. Where versioning is employed in RFS 202, the prior versions of file A in RFS 202 can be recovered if needed.

As another example, the intersections of column 1104 (RFS CREATE A) and rows 1116-1120 result in a (*) action. The (*) indicates that this combination of events should not happen. If it does, a full rescan sync (FRS) is triggered to resynchronize the LFS 204 and the RFS 202.

As still another example, the intersection of column 1104 (RFS CREATE A) and row 1122 (LFS RDF B to A) indicates an operation LMove B to A. The LMove action causes the file B in RFS 202 to be renamed as file A in the RFS 202. If the RFS 202 includes versioning, the existing file A in RFS 202 can be stored as an older version of file A in view of the renaming of B.

As yet another example, the intersection of column 1106 (RFS UPDATE A) and row 1118 (LFS UNLINK A), results in an action Pull A. Accordingly, RFS file A is pulled to LFS 204 and stored thereon as file A.

As another example, the intersection of column 1108 (RFS UNLINK A) and row 1118 (LFS UNLINK A) indicates No Action (NA). However, operations are generated that cause sync actions handler 626 to modify the sync table 628 to remove the file path therefrom.

As still another example, the intersection of column 1110 (RFS RENAME_SRC_FILE A to C) and row 1116 (UPDATE A) indicate the operations Move A to C and Push C. The Move operation causes file A to be renamed as file C in LFS 204. The Push C operation causes the renamed file C on LFS 204 to be pushed to RFS 202 and stored as another version of file C in RFS 202.

The other operations specified by table 1102 should be apparent in view of the above examples. It will also be apparent, that the operations specified in table 1102 for a particular conflict might not be a perfect solution to that conflict. However, when the RFS 202 (or optionally the LFS 204) includes file versioning, versions of data files occurring in the RFS 202 and in the LFS 204 can be maintained and can be recovered. It should also be noted that the conflict resolution operations specified in table 1102 can be modified to resolve conflicts in a desired way.

FIG. 11B shows a table 1124 for resolving conflicts between LFS file events and RFS directory events. The RFS directory events include MKDIR A in column 1126, RMDIR A in column 1128, RENAME_SRC_DIR (RSD) A to C in column 1130, and RENAME_DST_DIR (RDD) C to A in column 1132. Rows 1134-1142 correspond to the file events discussed above. Each row and column intersection of table 1124 indicates either "Skip" or (*). Skip indicates that no file system operations should be taken, even though the two events might be incompatible. Log entries (e.g., warnings) can be created for skip events, but an FRS should not be triggered. As indicated above, a (*) indicates a combination of events that should not occur. Therefore, an error is logged and an RFS triggered.

FIG. 11C shows a table 1144 for resolving conflicts between LFS directory events and RFS file events. Columns 1146-1154 indicate the RFS file events, and the rows 1156-1162 indicate the LFS directory events. Each row and column intersection of table 1144 indicates either "Skip" or (*) discussed above in FIG. 11B.

FIG. 11D shows a table 1164 for resolving conflicts between LFS directory events and RFS directory events. Columns 1166-1172 indicate the RFS directory events, and rows 1174-1180 indicate the LFS directory events. Each row and column intersection of table 1164 indicates the conflict resolution operation for that combination of events.

Some combinations indicate a (*). Accordingly, the conflict resolution of those combinations is the same as above (i.e., log error and perform FRS). Other intersections indicate FRS, in which an FRS will be performed. Still other intersections indicate LRS, which indicates that the associated directory should be subjected to a limited rescan synchronization process. Other intersections indicate that folder paths should be moved/renamed. LMove indicates that a corresponding folder path should be moved/renamed in the RFS 202. Conversely, Move indicates a folder path should be moved/rename in LFS 204. Finally, No Action (NA) indicates that no action should be taken for the particular combination of events. However, operations might still be generated to add a path to sync table 628 or recursively remove a path from sync table 628.

As with table 1102, the conflict resolution actions described in tables 1124, 1144, and 1164 might be compromise solutions. However, the conflict resolution actions can be implemented conservatively, and to favor data preservation, such as via versioning. Additionally, FRS and LRS processes can be called to ensure the integrity of the synchronization.

Returning now to FIG. 9, the phase 3 module 912 generates file system operations based on the processed remote and local events produced by the phase 0-2 modules. The phase 3 module 912 also integrates (e.g., chronologically, etc.) the file system operations generated by phase 2 module 910 during conflict resolution into the file system operations that will be output. Phase 3 module 912 then outputs a file system operation stream, including operations that it generated and operations that phase 2 module 910 generated, to sync actions handler 626.

The following are examples of file system operations that can be generated by phase 3 module 912 based on the processed local and remote event records.

(1) LFS UPDATE A+RFS UNLINK B=Push file A+Delete file B
(2) LFS RENAME A to B+RFS RENAME A to C=Push file B+Pull file C
(3) LFS MKDIR A+RFS UNLINK B+RFS RMDIR C=Push folder A+Delete file B+Delete folder C In the above examples, the operations for example (1) are generated by phase 3 module 912, the operations for example (2) are generated by phase 2 module 910 using table 1102, and the operations of example (3) are generated by phase 3 module 912. Phase 3 module 912 would assemble these file system operations into an operation output stream and provide that stream to sync action handler 626.

To generate file system operations, phase 3 module 912 categorizes events into three categories. Those categories are independent events, simple dependent events, and complex dependent events. An independent event is an event whose path has no events in the other file system. For example, a local event is independent if there are no remote events for its path. Similarly, a remote event is independent if there are no local events for its path. All other events are dependent events. A simple dependent event is a local event for whose path there is only one RFS event. Similarly, a simple dependent event is also a remote event for whose path there is only one LFS event. An event that is not independent or simple dependent is complex dependent.

Phase 3 module 912 generates file system operations directly for independent events. However, phase 3 module 912 relies on the conflict resolution of phase 2 to generate file system operations for simple dependent events. For complex dependent events, phase 3 module 912 collects the paths of the complex dependent events for limited rescan syncs of those paths. Phase 3 module 912 further generates operations to initiate the limited rescan syncs and full rescan syncs in the file system operation stream. Phase 3 module 912 generates and outputs the file system operation stream to sync actions handler 626 for all the processed event records generated during phases 0-3.

The following is pseudo-code to implement phase 3 processing:

```
gen_op(event):
   generate_operation(event)
   mark_as_processed(event)
collect_lrs_paths(event):
   collect the Limited Rescan Sync paths for event and all of its dependent
   events mark_as_processed(event and all its dependent events)
```

-continued

```
generate_operations(LFS events, CFS events)
    sort LFS and CFS events by timestamp
    for lfs_event in all non-processed LFS events:
        if is_independent_event(lfs_event): gen_op(lfs_event)
        elif is_simple_dependent_event(lfs_event):
            cfs_dep_event = get_dependent_event(lfs_event)
            for cfs_event in non-processed CFS events with timestamp <
            timestamp(cfs_dep_event):
                if is_independent_event(cfs_event):
                    gen_op(cfs_event)
                else:
                    collect_lrs_paths(cfs_event)
            generate operations for simple dependent LFS/CFS events
            according to the LFS/CFS event conflict resolution tables
            presented in phase 2
        else: # the LFS event has more than one dependency
            collect_lrs_paths(lfs_event)
    # process the remainder of CFS events
    for cfs_event in all non-processed CFS events:
        gen_op(cfs_event)
ops = generate_operations(LFS events, CFS events)
performs_actions(ops)
if limited_rescan_sync_path_list is not empty:
    perform LRS on the limited_rescan_sync_path_list
```

Finally, it should be noted that the file system operations available to be output by event processor 624 will be determined by the application and file system protocols being used. However, it is expected that file system operations such as push, pull, delete, move, rename, etc. will be widely employed. Additionally, the file system operations that are used can also include operations to trigger other processes (e.g., FRS, LRS, modification of tables, etc.).

Some methods of the present invention will now be described with reference to FIGS. 12-14. For the sake of clear explanation, these methods might be described with reference to particular elements discussed herein that perform particular functions. However, it should be noted that other elements, whether explicitly described herein or created in view of the present disclosure, could be substituted for those cited without departing from the scope of the present invention. Therefore, it should be understood that the methods of the present invention are not limited to any particular element(s) that perform(s) any particular function(s). Further, some steps of the methods presented need not necessarily occur in the order shown. For example, in some cases two or more method steps may occur simultaneously. These and other variations of the methods disclosed herein will be readily apparent, especially in view of the description of the present invention provided previously herein, and are considered to be within the full scope of the invention.

Figure 12:
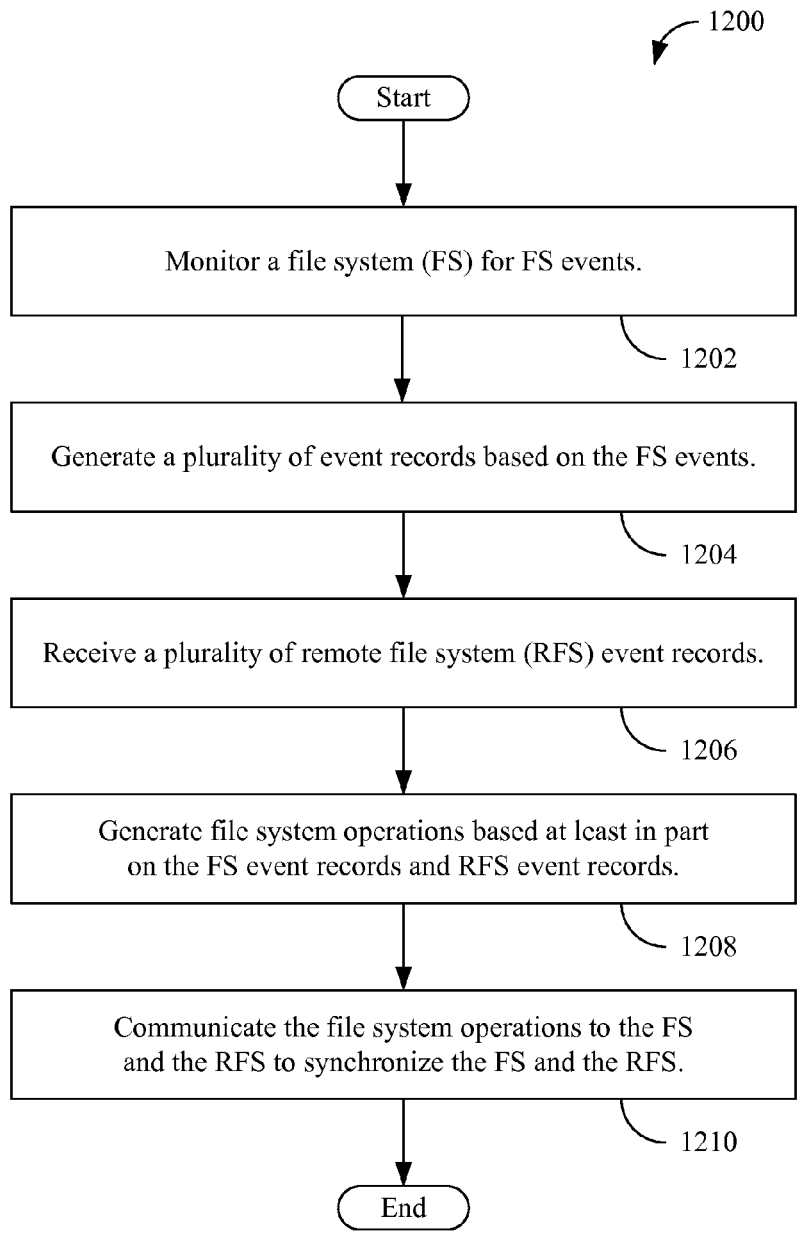
FIG. 12 is a flowchart summarizing a method for synchronizing a file system and a remote file system according to the present invention.

FIG. 12 is a flowchart summarizing a method 1200 for synchronizing a file system (FS) and a remote file system (RFS) that is located remotely from the FS. In a first step 1202, the FS (e.g., LFS 204) is monitored for FS events, where each of the FS events indicates a change made to the FS. In a second step 1204, a plurality of event records are generated based on the FS events, where each record is associated with one of the FS events. In a third step 1206, a plurality of RFS event records are received, where each RFS event record indicates a remote event that happened on the RFS (e.g., RFS 202). In a fourth step 1208, file system operations are generated based at least in part on the FS event records and the RFS event records. Then, in a fifth step 1210, the file system operations are communicated to the FS and the RFS to synchronize the FS and the RFS.

Figure 13:
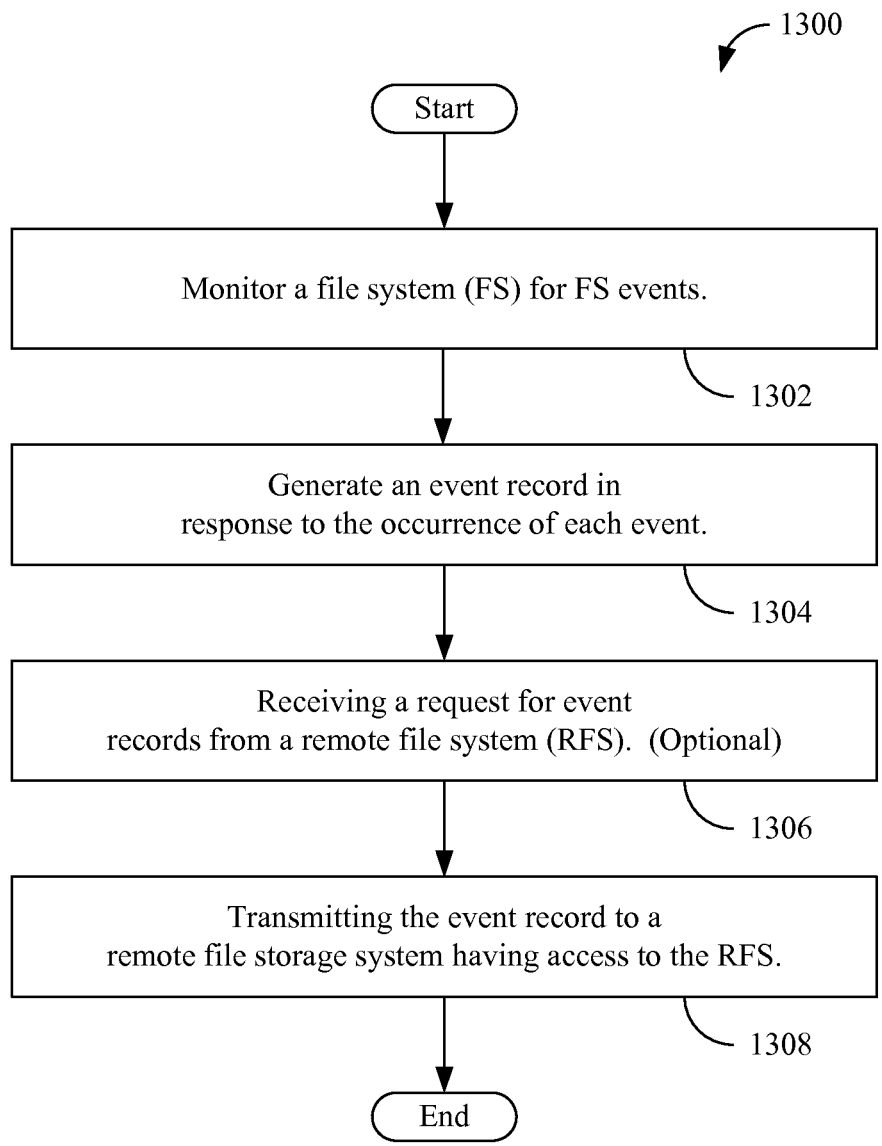
FIG. 13 is a flowchart summarizing another method for synchronizing a file system and a remote file system according to the present invention.

FIG. 13 is a flowchart summarizing another method 1300 for synchronizing a file system (FS) and a remote file system (RFS) that is located remotely from said FS. In a first step 1302, the FS (e.g., RFS 202) is monitored for events, where each of the events indicates a change made to the FS. In a second step 1304, an event record is generated in response to the occurrence of each of the events. In an optional third step 1306, a request for event records is received from the RFS (e.g., LFS 204). In a fourth step 1308, at least one event record is transmitted to a remote file storage system having access to the RFS.

Figure 14:
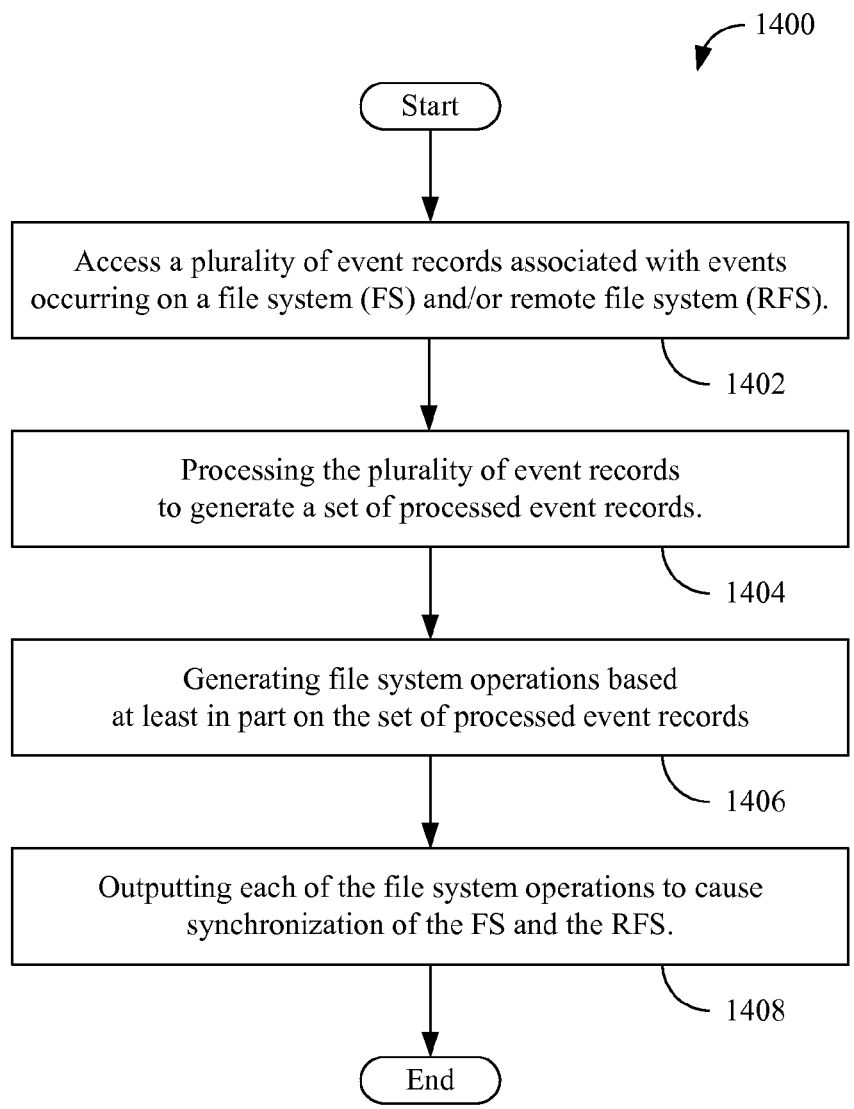
FIG. 14 is a flowchart summarizing a method for generating file system operations for synchronizing a file system and a remote file system according to the present invention.

FIG. 14 is a flowchart summarizing a method 1400 for generating file system operations for synchronizing a file system (FS) and a remote file system (RFS) that is remotely located from the FS. Method 1400 can be a method for performing step 1208 (generate file system operations) of FIG. 12.

Method 1400 includes a first step 1402 wherein a plurality of event records, which are associated with a plurality of events, are accessed. Each of the invents corresponds to a change previously made the FS or the RFS. In a second step 1404, the event records are processed to generate a set of processed event records. In a third step 1406, file system operations are generated based at least in part on the set of processed event records. Each of the file system operations is operative to cause a change to at least one of the FS and the RFS. In a fourth step 1408, the file system operations are output to cause synchronization of the FS and the RFS.

The description of particular embodiments of the present invention is now complete. Many of the described features may be substituted, altered or omitted without departing from the scope of the invention. For example, functional modules described with respect to the local cloud can also be implemented in the remote cloud. For example, an event processor could also be implemented in the remote cloud services such that event reduction could be performed, and file system operations could be generated, by the remote cloud. As another example, alternative conflict resolution actions can be developed depending on design goals. These and other deviations from the particular embodiments shown will be apparent to those skilled in the art, particularly in view of the foregoing disclosure.

We claim:

1. In a local file storage system, a method for synchronizing a local file system (LFS) and a remote file system (RFS) that is located remotely from said LFS, said method comprising:

monitoring said LFS for local events, each of said local events being indicative of a change made to said LFS;

generating a plurality of local event records based on said local events, each of said local event records being associated with one of said local events;

receiving a plurality of remote event records associated with remote events from a remote file storage system having access to said RFS, each of said remote event records being indicative of a remote event that changed said RFS;

processing said local event records and said remote event records together to generate a set of processed event records, said set of processed event records including a combination of processed ones of said local event records and processed ones of said remote event records;

generating file system operations using said set of processed event records, some of said file system operations for altering said LFS and others of said file system operations for altering said RFS;

applying said some of said file system operations to said LFS to alter said LFS; and communicating said others of said file system operations to said remote file storage system, whereby said remote file storage system can apply said others of said file system operations to alter said RFS; and wherein portions of said LFS and said RFS are synchronized as said file system operations are applied to said LFS and said RFS.

2. The method of claim 1, further comprising:
storing said plurality of local event records in a first events database; and
storing said plurality of remote event records in a second events database.

3. The method of claim 2, further comprising:
storing said plurality of local event records in said first events database in chronological order; and
storing said plurality of remote event records in said second events database in chronological order.

4. The method of claim 3, wherein said step of generating file system operations includes:
retrieving at least some of said local event records from said first events database according to the hierarchy of said LFS; and
retrieving at least some of said remote event records from said second events database according to the hierarchy of said RFS.

5. The method of claim 3, further comprising:
copying at least some of said local event records to a third events database prior to said step of processing said local event records and said remote event records; and
copying at least some of said remote event records to a fourth events database prior to said step of processing said local event records and said remote event records.

6. The method of claim 1, further comprising:
establishing a connection with said remote file storage system; and
receiving said plurality of remote event records via said connection.

7. The method of claim 6, further comprising providing said others of said file system operations to said remote file storage system via said connection.

8. The method of claim 1, further comprising:
defining an event synchronization time period; and wherein
said step of generating file system operations is based only on ones of said local events and ones of said remote events that occurred during said event synchronization time period.

9. The method of claim 8, wherein the duration of said event synchronization time period is adjustable.

10. The method of claim 1, further comprising synchronizing said LFS and said RFS prior to said step of monitoring said LFS for local events.

11. The method of claim 1, further comprising:
establishing a client connection with a client desiring access to said LFS; and wherein
said step of monitoring said LFS for changes includes
monitoring calls going to said LFS via said client connection and
executing a trap in response to each of said calls that will result in a change to said LFS, said trap resulting in the generation of one of said local event records.

12. The method of claim 1, wherein said step of generating file system operations is performed after each local event record is generated.

13. The method of claim 1, wherein said step of processing said local event records and said remote event records includes:

identifying ones of said local and remote event records according to a type of event; and
modifying at least some of said identified event records having said type.

14. The method of claim 13, wherein said step of processing said local event records and said remote event records further includes deleting some of said event records.

15. The method of claim 14, further comprising:
accessing a local event record associated with a local event occurring on said LFS;
accessing a remote event record associated with a remote event occurring on said RFS; and wherein
said local event record and said remote event record are associated with a common file system object that is common to both said LFS and said RFS; and
said step of processing said local event records and said remote event records includes resolving a conflict between said local event and said remote event.

16. A local file storage system comprising:
memory for storing a local file system (LFS) including local file system objects;
a client interface operative to enable a client to access said local file system objects;
a local file system module operative to monitor for changes being made to said LFS by said client and to output local event information about each of said changes;
a data monitor operative to generate local event records responsive to local event information received from said local file system module;
a remote file server interface operative to establish a connection with a remote file storage system and facilitate communication with said remote file storage system, said remote file storage system having access to a remote file system (RFS);
a synchronizer operative to receive a plurality of remote event records from said remote file storage system, said remote event records being indicative of changes made to said RFS;
an event processor operative to
process said local event records and said remote event records together to generate a set of processed event records, said set of processed event records including a combination of processed ones of said local event records and processed ones of said remote event records, and
generate file system operations using said set of processed event records, some of said file system operations for altering said LFS and others of said file system operations for altering said RFS;
a sync action handler operative to
apply said some of said file system operations to said LFS to alter said LFS and
cause said others of said file system operations to be transmitted to said remote file storage system, whereby said remote file storage system can apply said others of said file system operations to alter said RFS; and wherein
portions of said LFS and said RFS are synchronized as said file system operations are applied to said LFS and said RFS.

17. The system of claim 16, further comprising:
a first event database operative to store said local event records; and
a second event database operative to store said remote event records.

18. The system of claim 17, wherein:
said local event records are stored in said first event database in chronological order; and
said remote event records are stored in said second event database in chronological order.

19. The system of claim 18, wherein:
said first event database is operative to return local event records according to the hierarchy of said LFS; and
said second event database is operative to return remote event records according to the hierarchy of said RFS.

20. The system of claim 18, wherein:
said data monitor is further operative to copy some of said local event records from said first event database to a third event database;
said synchronizer is further operative to copy some of said remote event records from said second event database to a fourth event database; and
said event processor is operative to process only said local event records and said remote event records stored in said third event database and said fourth event database.

21. The system of claim 16, wherein said synchronizer is further operative to:
request remote event records via said remote file server interface; and
store said remote event record in said second events database.

22. The system of claim 16, wherein said sync action handler utilizes application program interfaces to apply said file system operations to said LFS and to transmit said others of said file system operations to said remote file storage system.

23. The system of claim 16, wherein:
said synchronizer is further operative to define an event synchronization time period; and
said event processor is operative to process only ones of said local event records and ones of said remote event records that are associated with events occurring during said event synchronization time period.

24. The system of claim 23, wherein the duration of said event synchronization time period is adjustable.

25. The system of claim 16, wherein said LFS and said RFS are initially synchronized.

26. The system of claim 16, wherein said local file system module is operative to:
monitor input/output (I/O) calls going to said LFS; and
execute a trap for each of said I/O calls that will change said LFS.

27. The server of claim 16, wherein, to generate said processed event records, said event processor is further operative to:
identify ones of said local event records and said remote event records based on a type of event; and
modify at least some of said identified event records having said type.

28. The server of claim 27, wherein, to generate said processed event records, said event processor is further operative to delete some of said event records.

29. The server of claim 28, wherein, to generate said processed event records, said event processor is further operative to:
access a local event record associated with a local event occurring on a common file system object in said LFS;
access a remote event record associated with a remote event occurring on said common file system object in said RFS; and
generate one or more file system operations that resolve a conflict between said local event and said remote event.

30. A local file storage system comprising:
memory for storing a local file system (LFS) including local file system objects;
a client interface operative to enable a client to access said local file system objects;
a local file system module operative to monitor for changes to said LFS by said client;
means for generating local event records of changes being made to said LFS as said changes occur;
means for receiving remote event records from a remote file storage system, said remote event records being indicative of changes made to a remote file system (RFS) accessible by said remote file storage system, said remote event records being indicative of changes made to said RFS;
means for processing said local event records and said remote event records together to generate a set of processed event records, said set of processed event records including a combination of processed ones of said local event records and processed ones of said remote event records;
means for generating file system operations using said set of processed event records, some of said file system operations for altering said LFS and others of said file system operations for altering said RFS;
means for applying said some of said file system operations to said LFS to alter said LFS and for causing said others of said file system operations to be communicated to said remote file storage system, whereby said remote file storage system can apply said others of said file system operations to alter said RFS; and wherein
portions of said LFS and said RFS are synchronized as said file system operations are applied to said LFS and said RFS.

31. A file storage system comprising:
a local file storage system storing a local file system (LFS);
a remote file storage system storing a remote file system (RFS);
a local event monitor on said local file storage system, said local event monitor operative to generate local event records indicative of changes made to said LFS;
a remote event monitor on said remote file storage system operative to generate remote event records indicative of changes made to said RFS;
a synchronizer on one of said local file storage system and said remote file storage system, said synchronizer being operative to receive a plurality of event records from the other of said local file storage system and said remote file storage system;
an event processor on the same one of said local file storage system and said remote file storage system as said synchronizer, said event processor being operative to
process said local event records and said remote event records together to generate a set of processed event records, said set of processed event records including a combination of processed ones of said local event records and processed ones of said remote event records and
generate file system operations using said set of processed event records, some of said file system operations for altering said LFS and others of said file system operations for altering said RFS; and a sync action handler on the same one of said local file storage system and said remote file storage system as said synchronizer, said sync action handler being operative to
- apply file system operations to one of said LFS and said RFS to alter said one of said LFS and RFS and
- cause file system operations to be transmitted to the other of said local file storage system and said remote file storage system; and wherein
portions of said LFS and said RFS are synchronized as said file system operations are applied to said LFS and said RFS.

32. The method of claim 1, wherein each file system operation used to synchronize said LFS and said RFS originates at said local file storage system.

33. A non-transitory, electronically-readable storage media having code embodied therein for causing an electronic device to:
- monitor a local file system (LFS) for local events, each of said local events being indicative of a change made to said LFS;
- generate a plurality of local event records based on said local events, each of said local event records being associated with one of said local events;
- receive a plurality of remote event records associated with remote events from a remote file storage system having access to a remote file system (RFS), each of said remote event records being indicative of a remote event that changed said RFS;
- process said local event records and said remote event records together to generate a set of processed event records, said set of processed event records including a combination of processed ones of said local event records and processed ones of said remote event records;
- generate file system operations using said set of processed event records, some of said file system operations for altering said LFS and others of said file system operations for altering said RFS;
- apply said some of said file system operations to said LFS to alter said LFS; and
- communicate said others of said file system operations to said remote file storage system, whereby said remote file storage system can apply said others of said file system operations to alter said RFS; and
- wherein portions of said LFS and said RFS are synchronized as said file system operations are applied to said LFS and said RFS.

* * * * *